(12) United States Patent
Ho et al.

(10) Patent No.: US 10,990,134 B2
(45) Date of Patent: Apr. 27, 2021

(54) COVER FOR PORTABLE ELECTRONIC DEVICE

(71) Applicant: Incase Designs Corp., Los Angeles, CA (US)

(72) Inventors: William Ho, Chino Hills, CA (US); Steven Corraliza, Oakland, CA (US); Hyun Hong, Los Angeles, CA (US)

(73) Assignee: Incase Designs Corp., Irvine, CA (US)

( * ) Notice: Subject to any disclaimer, the term of this patent is extended or adjusted under 35 U.S.C. 154(b) by 18 days.

(21) Appl. No.: 16/186,371

(22) Filed: Nov. 9, 2018

(65) Prior Publication Data
US 2020/0150727 A1    May 14, 2020

(51) Int. Cl.
| | |
|---|---|
| *B65D 85/30* | (2006.01) |
| *G06F 1/16* | (2006.01) |
| *A45C 11/00* | (2006.01) |
| *B29C 65/48* | (2006.01) |
| *B29C 65/00* | (2006.01) |
| *B29L 31/00* | (2006.01) |

(52) U.S. Cl.
CPC ............ *G06F 1/1656* (2013.01); *A45C 11/00* (2013.01); *B29C 65/4835* (2013.01); *B29C 66/0246* (2013.01); *B29C 66/7292* (2013.01); *A45C 2011/003* (2013.01); *B29L 2031/768* (2013.01)

(58) Field of Classification Search
CPC ............ A45C 11/00; A45C 2011/002; A45C 2011/003; B29C 65/4835; B29C 66/0246; G06F 1/203; G06F 1/1613; G06F 1/1616; G06F 2200/1633

USPC ............... 206/320, 576; 361/679.55, 679.56; 455/575.1, 575.8
See application file for complete search history.

(56) References Cited

U.S. PATENT DOCUMENTS

| | | | | |
|---|---|---|---|---|
| 2008/0308437 | A1* | 12/2008 | Lin ..................... | G06F 1/1616 206/320 |
| 2012/0160720 | A1* | 6/2012 | Mongan ............... | G06F 1/1616 206/320 |
| 2013/0056374 | A1* | 3/2013 | Chung .................. | A45C 11/00 206/320 |
| 2013/0140194 | A1* | 6/2013 | Han ..................... | G06F 1/1656 206/45.23 |
| 2017/0105292 | A1* | 4/2017 | Kuzmenko ............ | A45C 5/02 |
| 2018/0348817 | A1* | 12/2018 | Armstrong ........... | G06F 1/1613 |
| 2019/0053590 | A1* | 2/2019 | Philip .................. | A45C 11/00 |

* cited by examiner

*Primary Examiner* — Luan K Bui

(57) ABSTRACT

A light, durable, and user friendly cover for a laptop computer that integrates the protective qualities of hard shell cases with the aesthetics of soft cut-and-sew covers is disclosed. The cover includes top and bottom panels configured to cover the display and keyboard portions, respectively. Each panel is independent and separate from the other and each is formed as a unitary component of a molded resilient polymer material, such as polycarbonate, that is configured to reversibly and retentively snap-fit over the outer surface of the laptop computer. Each panel includes a raised lip along its perimeter edge region that defines an internally extending recessed region on the panel's outer surface. Fabric and/or leather overlays are positioned, sized and adhesively coupled atop the recessed regions and are protected from delaminating, fraying, and/or peeling by the raised perimeter lip.

19 Claims, 35 Drawing Sheets

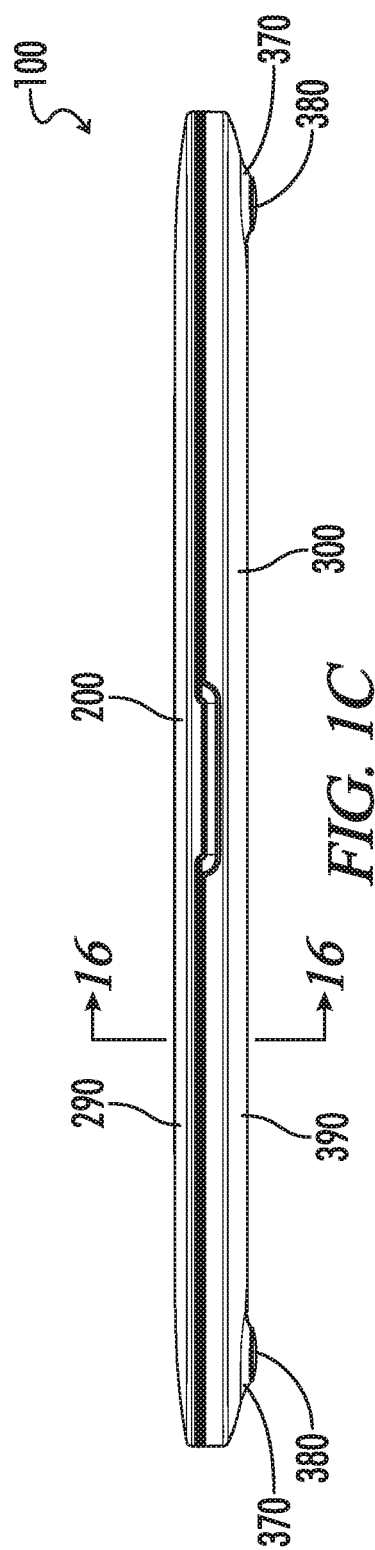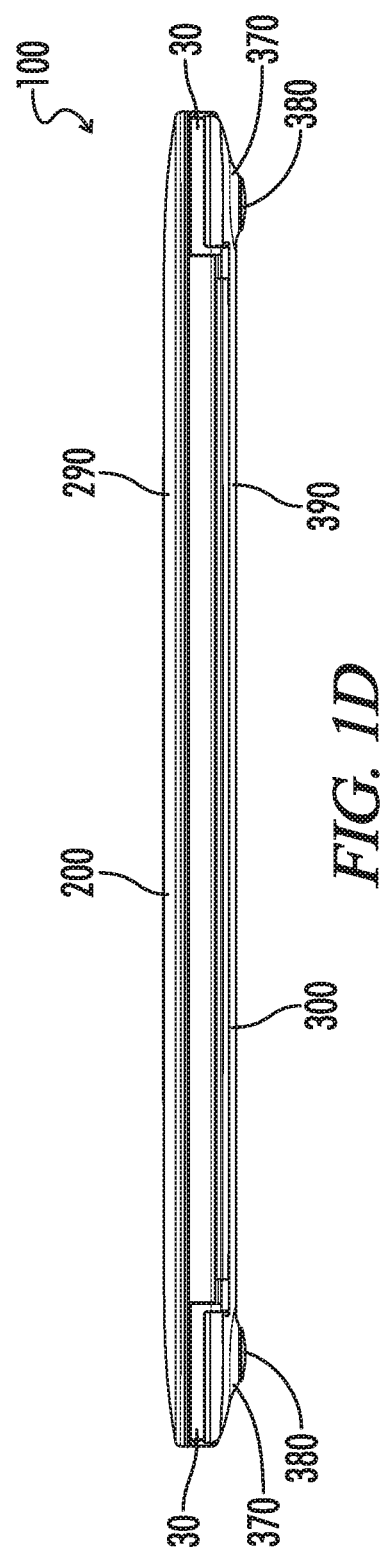

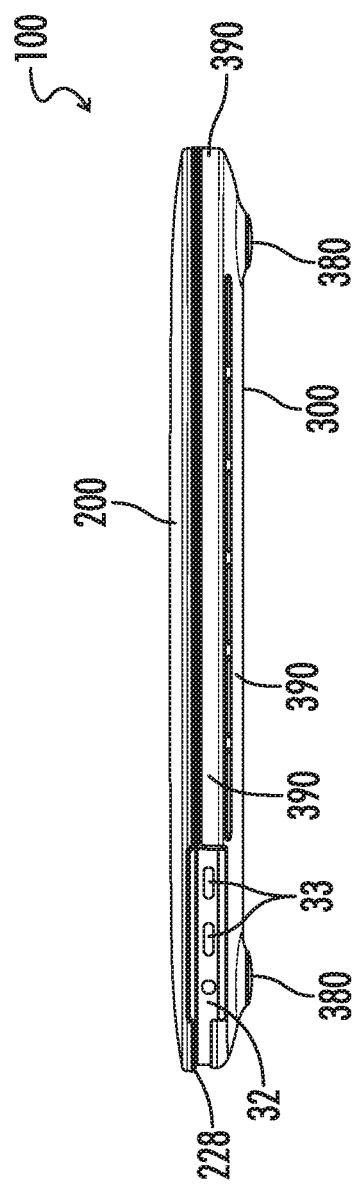
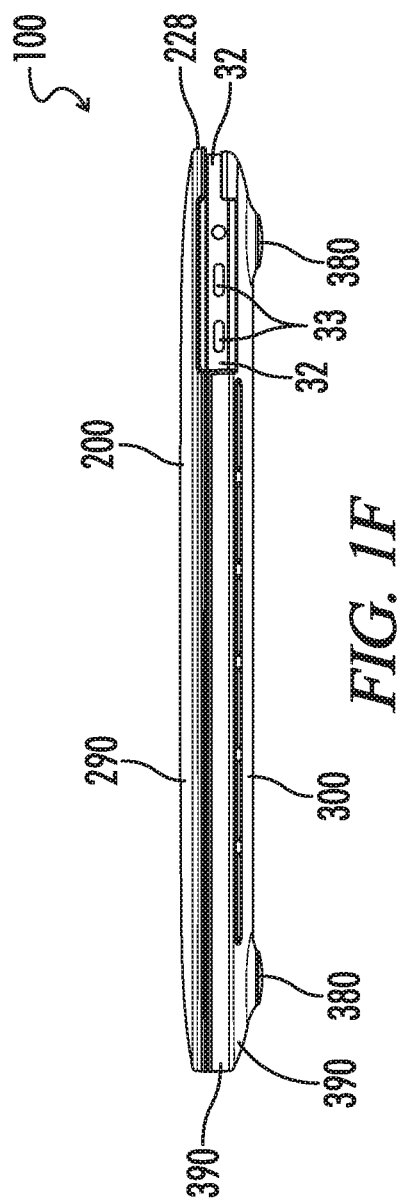
FIG. 1E
FIG. 1F

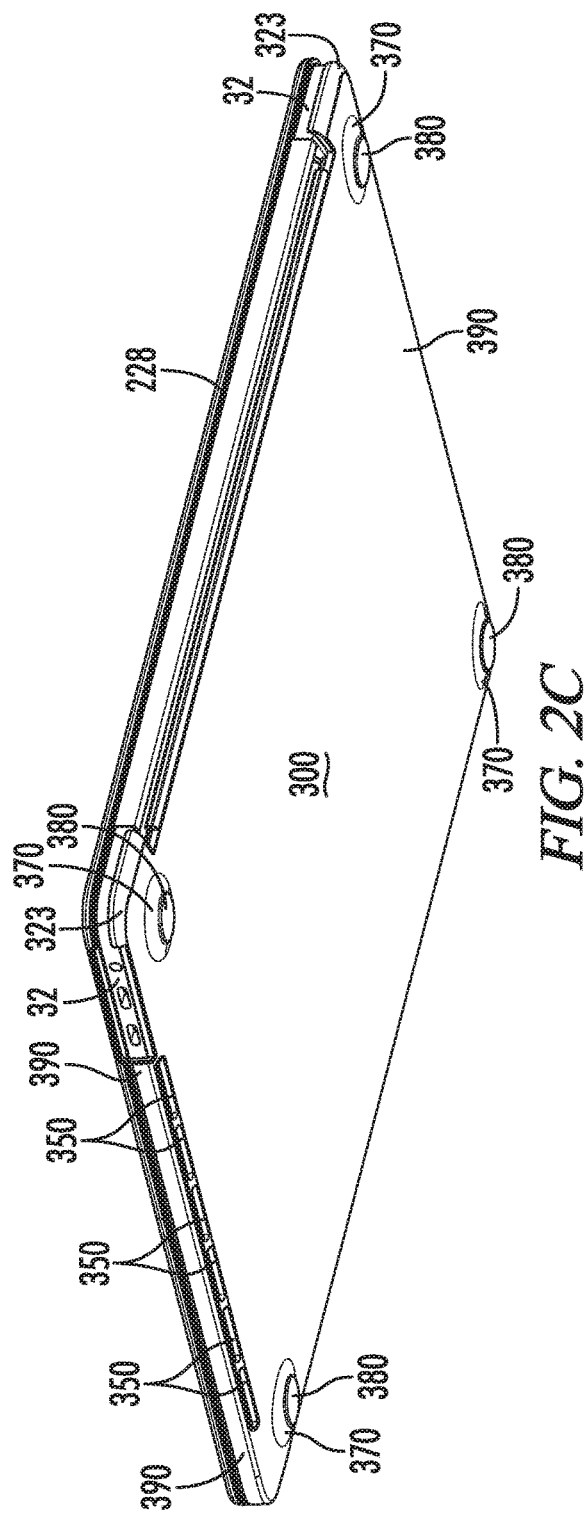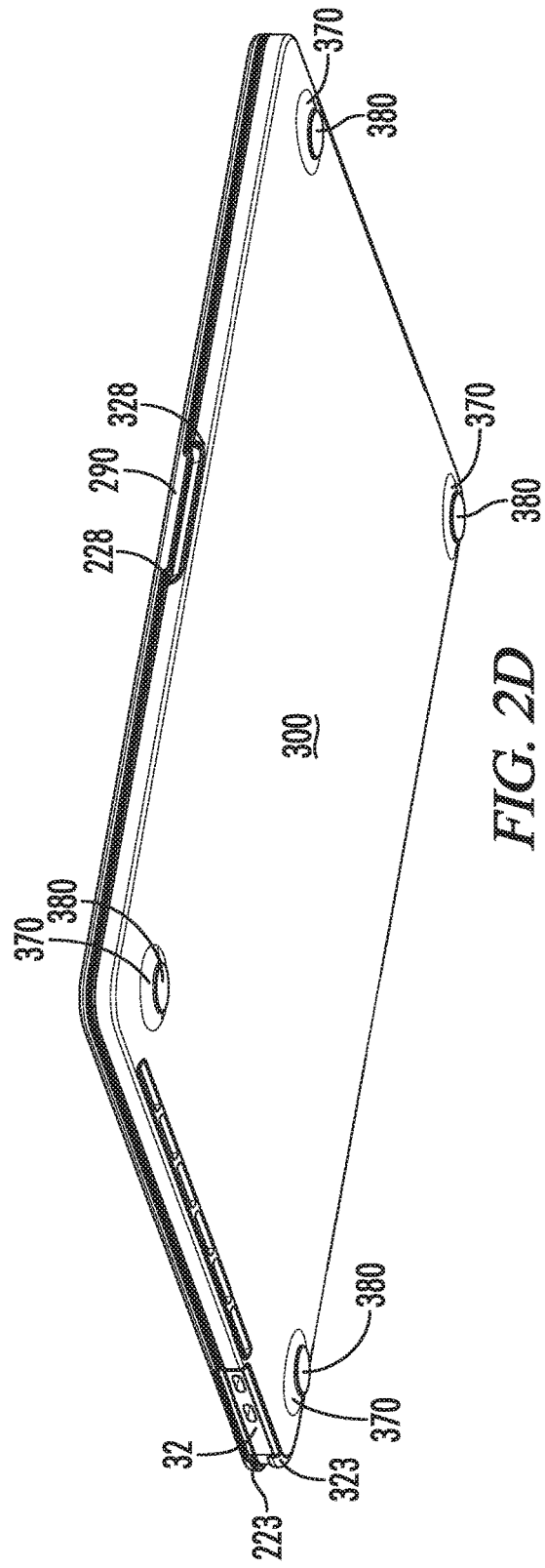

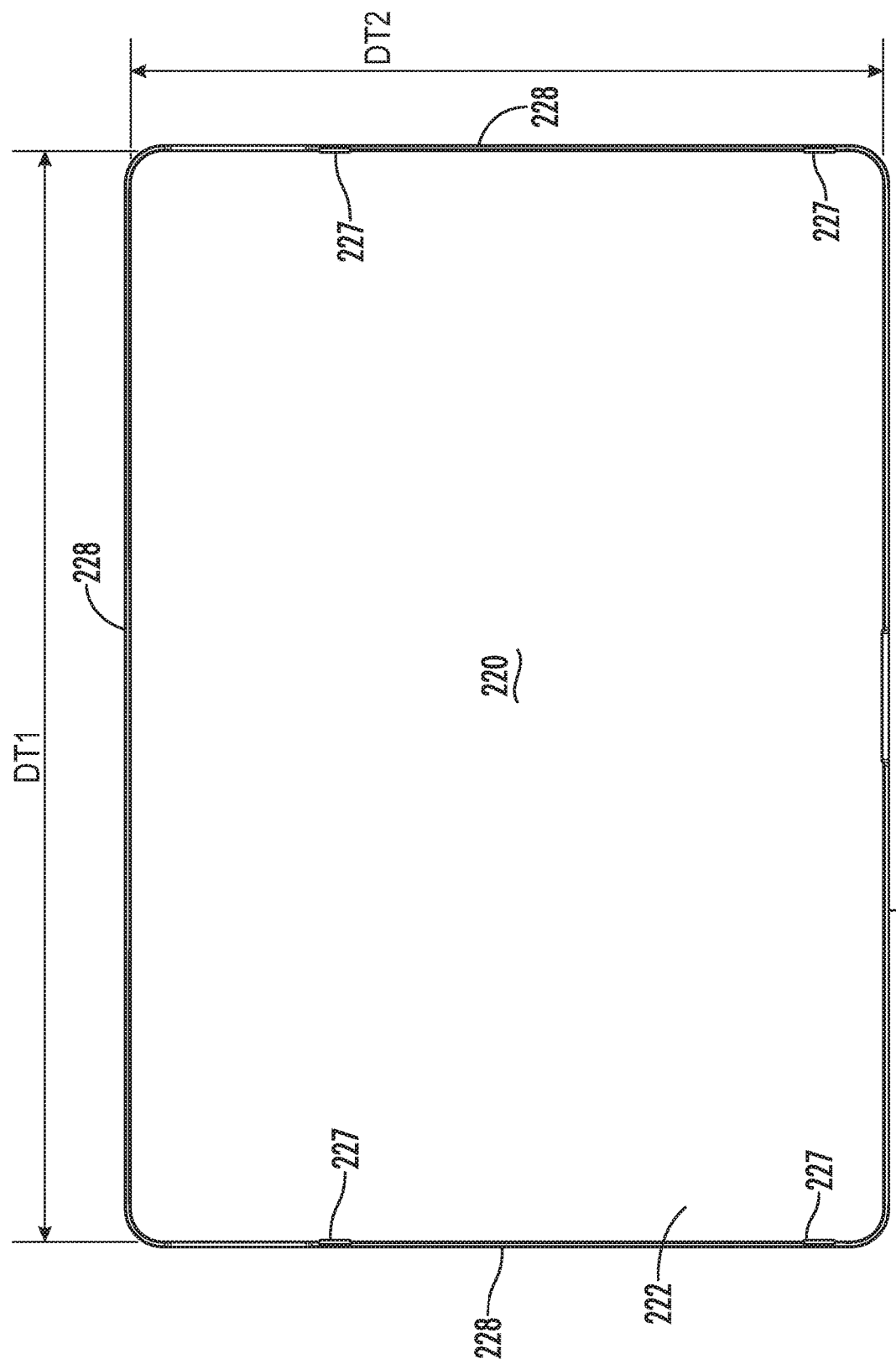

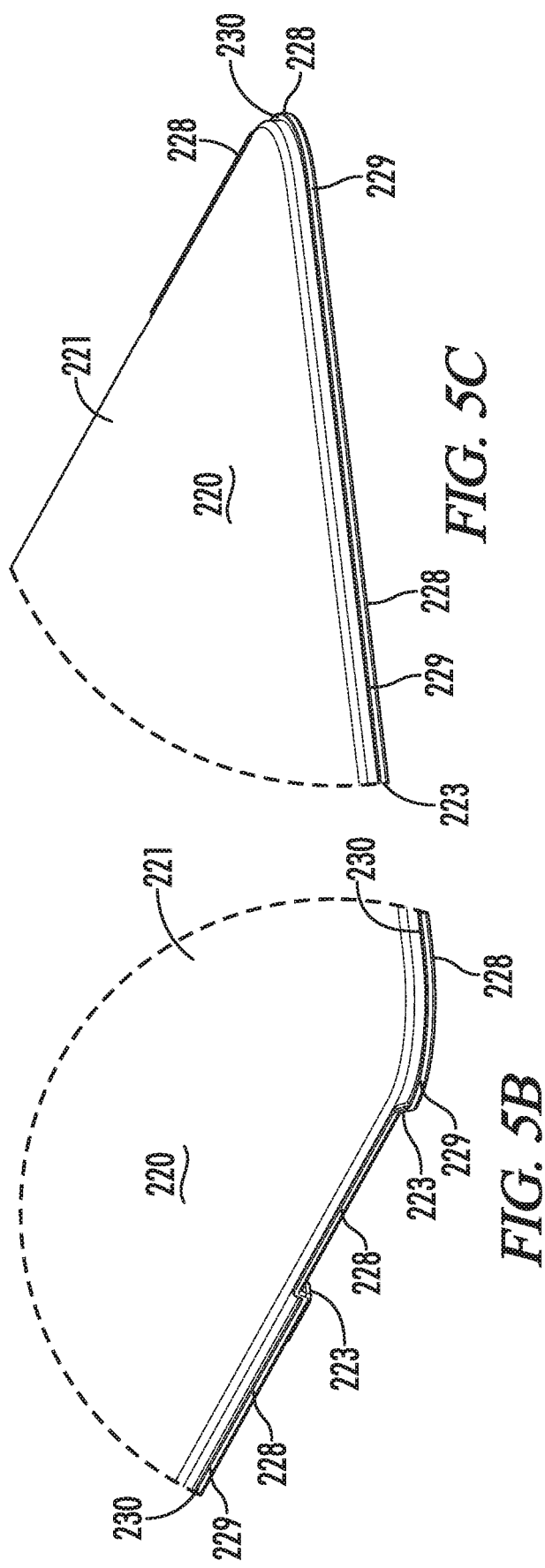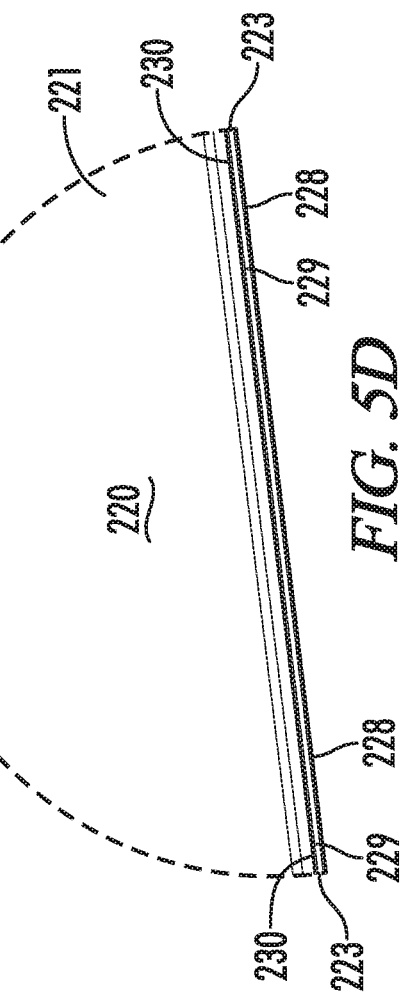

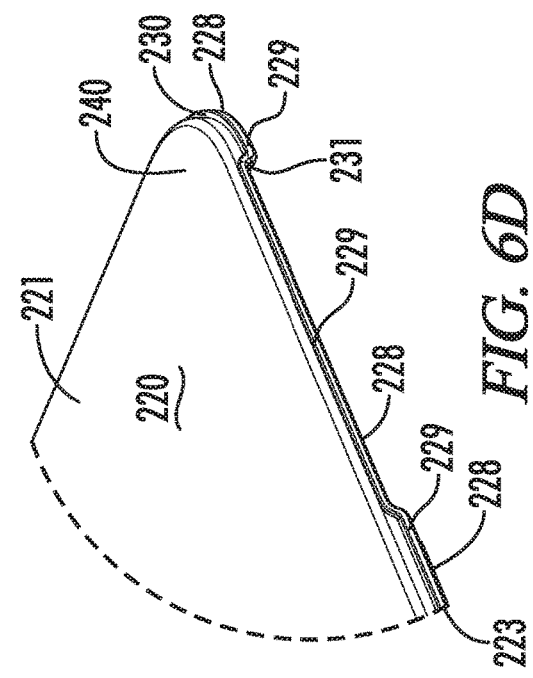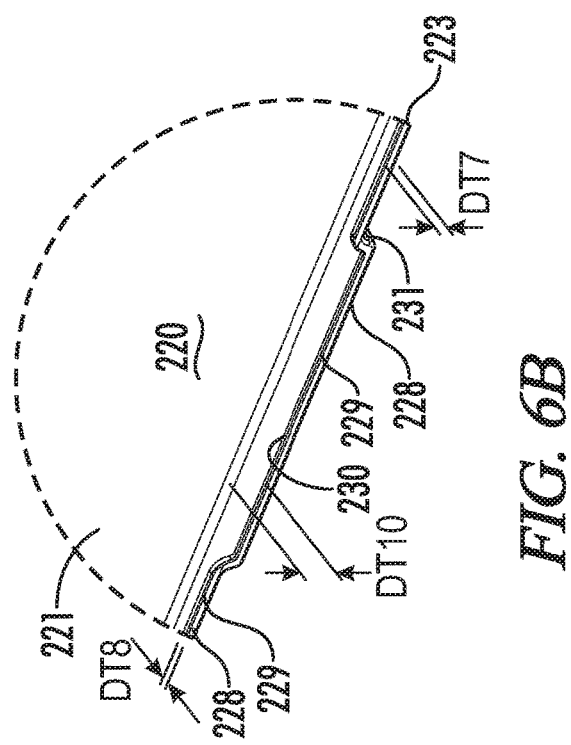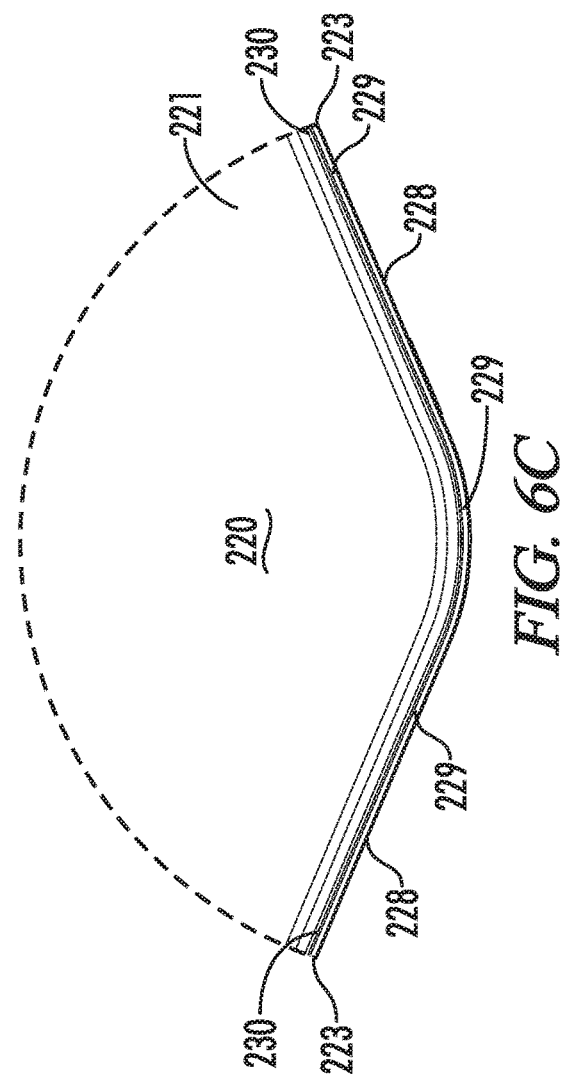

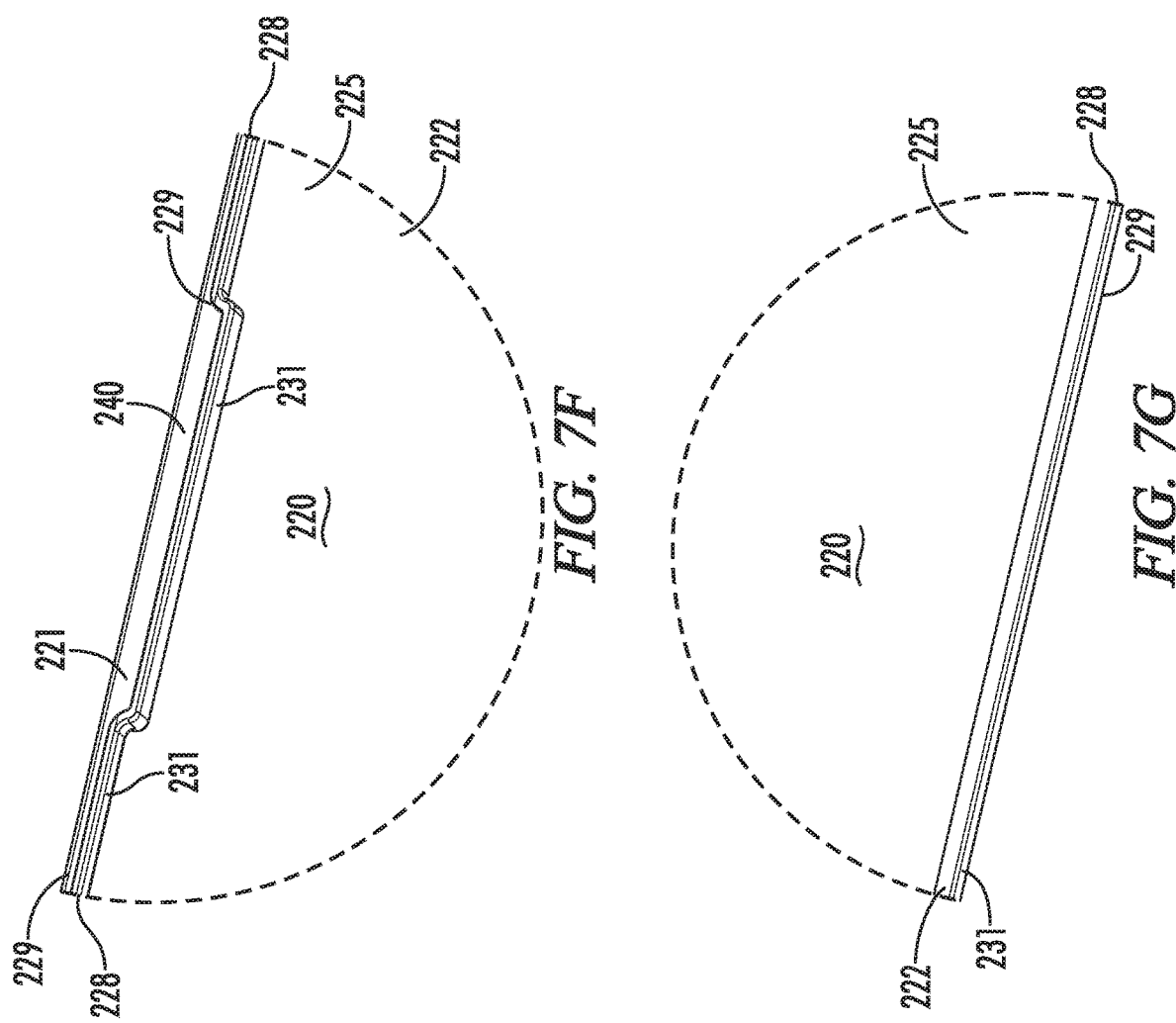

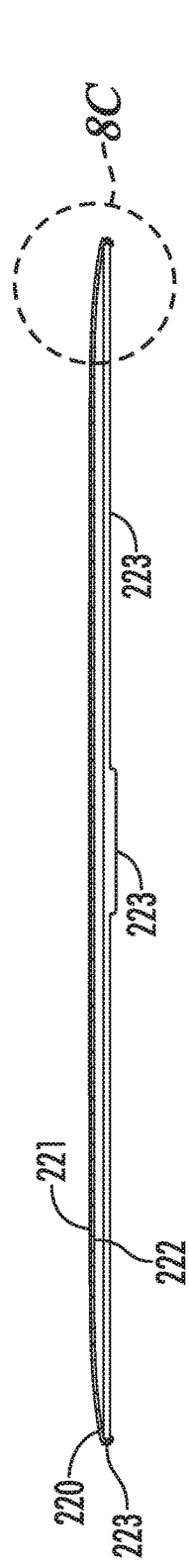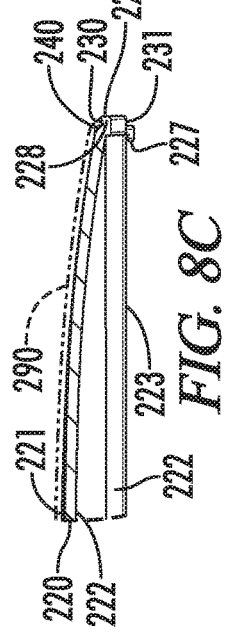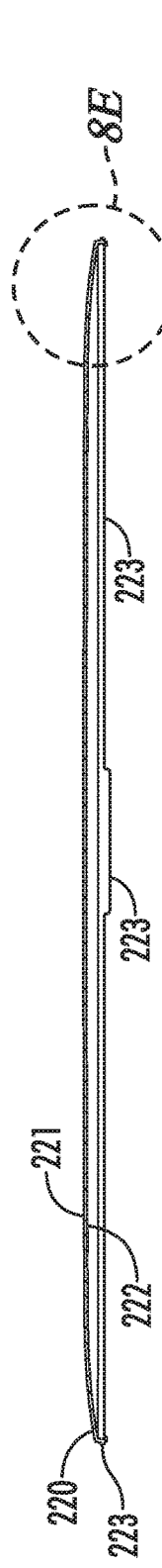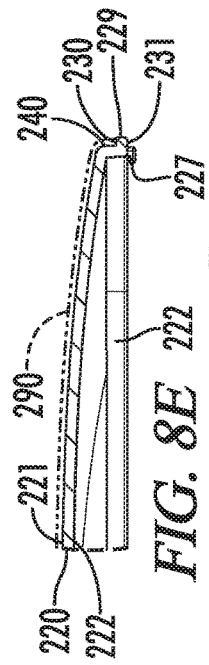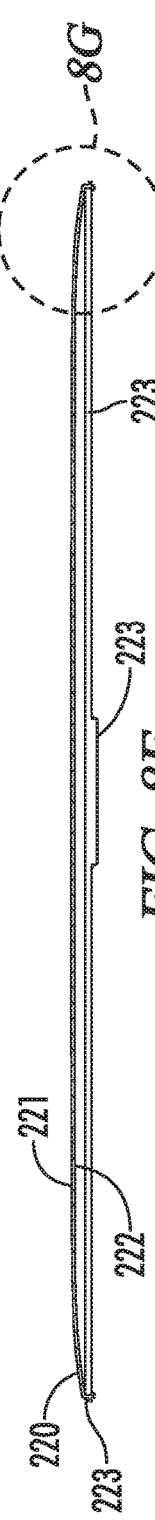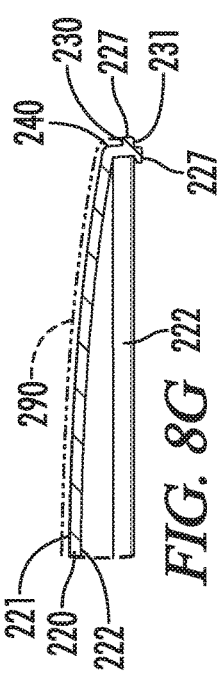

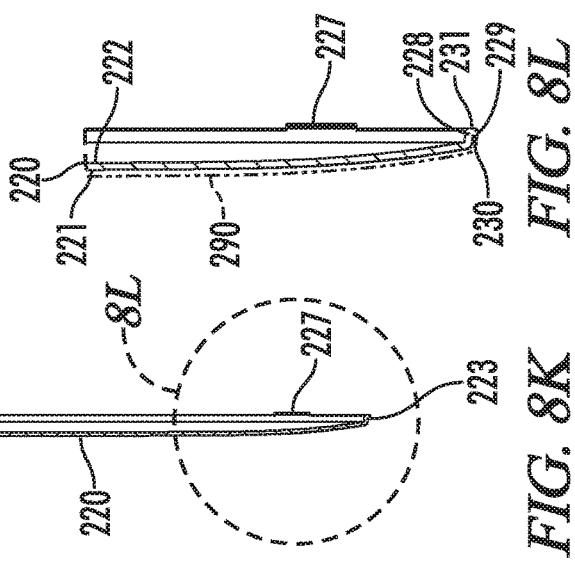
FIG. 8K
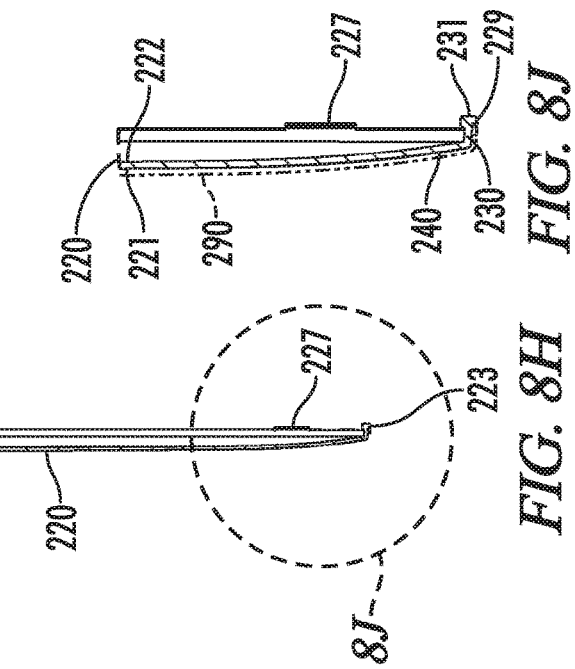
FIG. 8L
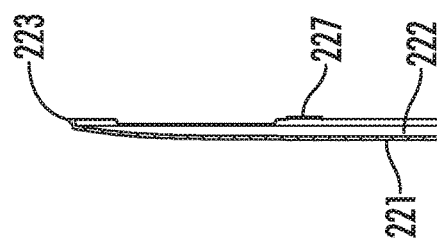
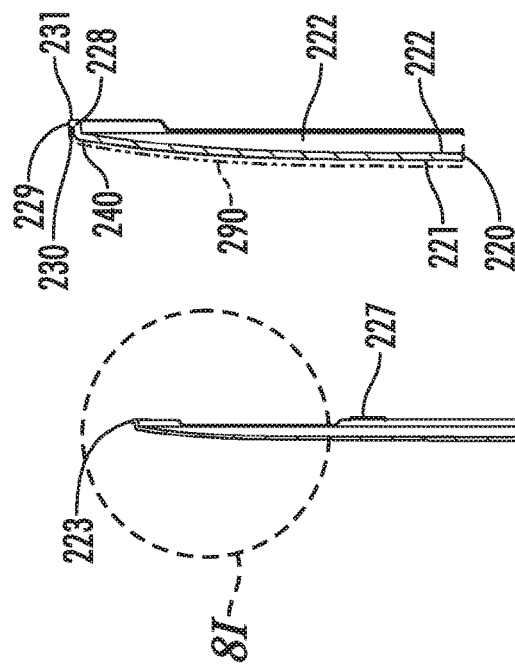
FIG. 8H
FIG. 8I
FIG. 8J

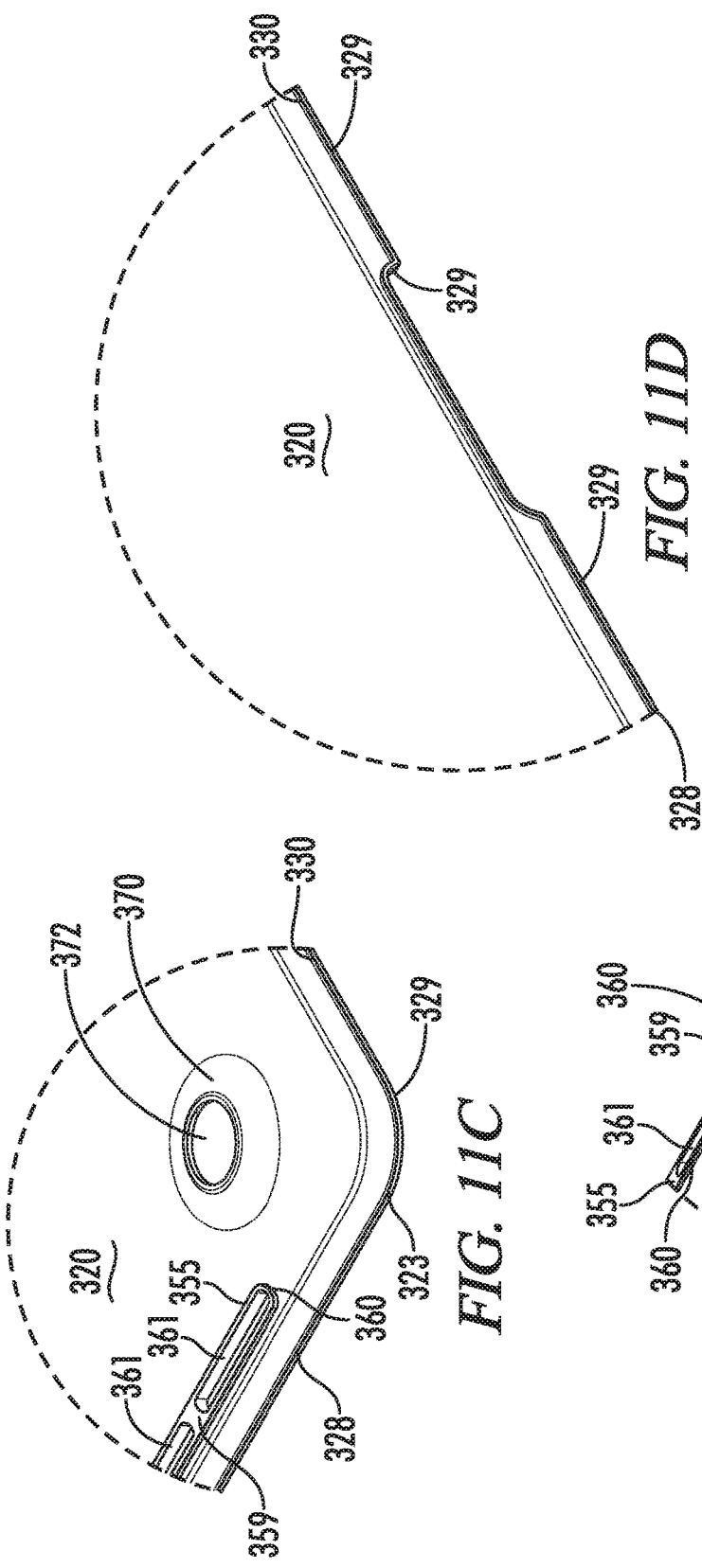
FIG. 11D
FIG. 11C
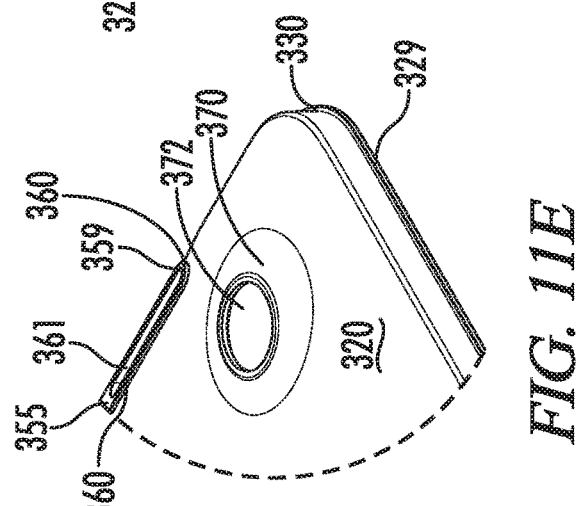
FIG. 11E

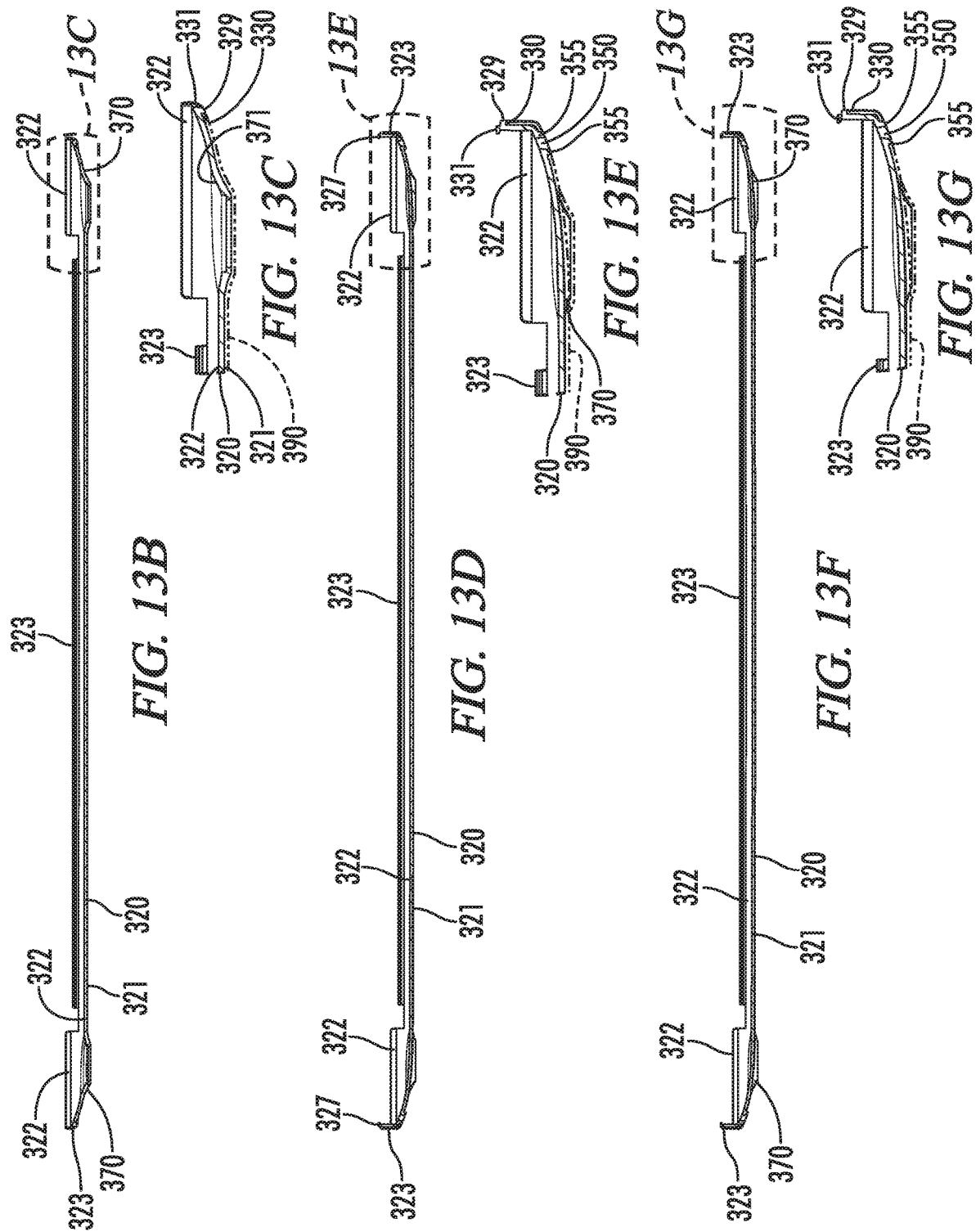

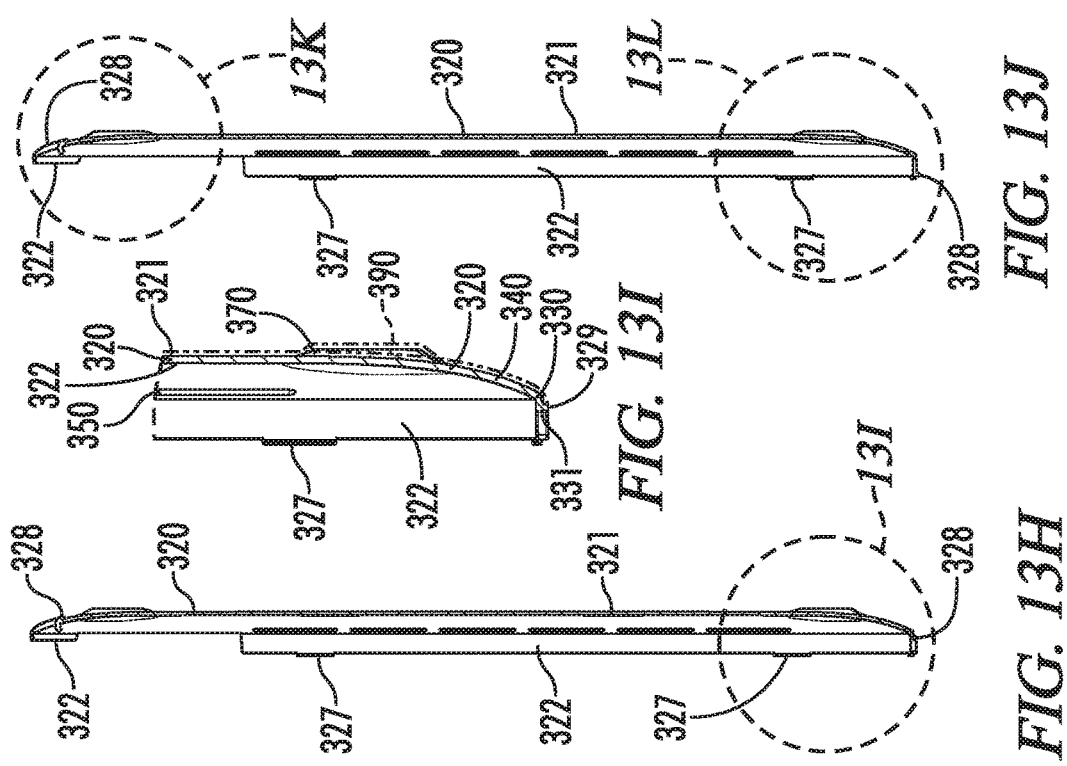

COVER FOR PORTABLE ELECTRONIC DEVICE

CROSS-REFERENCE TO RELATED APPLICATIONS

N/A.

FIELD AND BACKGROUND

The present invention generally relates to the field of covers or cases for portable electronic devices, and particularly to fabric or leathered covered hard shell cases for computing devices such as laptop computers.

Portable electronic devices like smartphones, mobile phones, tablets, personal digital assistants (PDAs), laptop computers, pagers, media or MP3 players, and portable game consoles have had a transforming impact on how people play and record music, send and receive e-mail and text messages, browse Web pages, make phone calls, play and record video, take and view pictures, edit documents, interface with social media, and much more. These devices continue to revolutionize the way we interact, learn, connect, conduct business, and socialize. They help manage our daily lives, store valuable information including business and personal information (e.g., phone numbers, financial information, private photos or videos, and favorite music tracks), and can be a source of entertainment.

In today's on-the-go and always-connected world, it is not uncommon for consumers to continuously have their electronic devices with or near them, whether it be at work, home, or during business or leisure travel. Electronic devices, however, commonly include fragile components (e.g., screens, glass and/or aluminum or soft metal casings) that can be easily damaged and are manufactured with limited finishes that are not necessarily appealing to consumers in some or all environments or settings.

Various after-market hard and soft shell cases or covers have been developed to accessorize and protect portable electronic devices. Notwithstanding, the inventors here have recognized that there is a continued need to develop light weight, user friendly, protective cases, that uniquely meld the benefits of, and blur the lines between, soft and hard shell cases by providing aesthetically pleasing external surfaces found in cut-and-sew soft shell covers with the simplicity and durability of hard shell cases.

SUMMARY

A light, durable, and user friendly cover for a mobile electronic device is disclosed. The cover integrates the protective qualities of hard shell cases with the aesthetics of soft cut-and-sew covers. In accordance with one embodiment, the cover is for a laptop computer and includes top and bottom panels configured to cover the display and keyboard portions of the laptop computer. Each panel is independent and separate from the other and each is formed as a unitary component of a molded resilient polymer material, such as polycarbonate, that is configured to reversibly and retentively snap-fit over the outer surface of the laptop computer. Each panel includes a raised lip along its perimeter edge region that defines corresponding recessed regions on the panel's outer surface. Fabric and/or leather overlays are positioned, size matched, and adhesively coupled atop the recessed regions and are protected from delaminating, fraying, and/or peeling by the raised perimeter lip. Various structures including internally positioned ventilation holes and support feet and corresponding footing platforms may be included and are configured to also protect the fabric/leather overlays from delaminating, fraying, and/or peeling.

While the illustrated embodiment of the cover is directed to a laptop computer having display and keyboard portions hinged together, the cover may be configured for different types of electronic devices, such as smart phones or tablet computing devices. In such configurations, the bottom and/or top cover would include an inner surface that is configured to reversibly and retentively snap-fit over the outer surface of the electronic device so that the electronic device screen and user interfaces are accessible.

Novel methods of manufacturing the top and bottom covers, and component thereof are also disclosed. The methods are directed to preparation and sizing and cutting the fabric/leather overlays, forming the shell or panel components, position and adhesively coupling the overlay to the panels and forming and securing support feet to the cover.

Other features and advantages of the disclosed covers and methods of construction will become apparent upon consideration of the following detailed description and the accompanying drawings.

BRIEF DESCRIPTION OF THE DRAWINGS

FIGS. 1A-1F illustrates a top, bottom, front, rear, left and right side views, respectively, of an exemplary exterior cover embodiment that includes a top cover configured to cover the display portion of a laptop computer and a bottom cover configured to cover the keyboard portion of a laptop computer. The illustrated cover is specifically configured to fit an Apple® 15-inch MacBook Pro® laptop computer, which is depicted in the cover, and is shown in a closed position. The dotted textured surfaces, illustrated in the drawings, depict fabric or leather overlays that are coupled to recessed regions, which are defined by a raised perimeter wall or lip, on the outer surface of flexible hard shell panels configured to receive and protect the overlays.

FIG. 2C is a bottom rear-right perspective view of the cover illustrated in FIGS. 1A-1F.

FIG. 2D is a bottom front-left perspective view of the cover illustrated in FIGS. 1A-1F.

FIG. 4B is an interior view of the display cover illustrated in FIG. 4A with the display portion of the laptop computer removed to reveal the inner surface of the top cover panel. DT1 and DT2 define the length and width of the display compartment defined by the inner surface of the top cover panel.

FIGS. 5B-5D are enlarged perspective views of the corresponding enumerated areas of the top cover panel circled in FIG. 5A to further illustrate the curvature of the outer surface of the panel and the recessed region defined by the raised perimeter wall.

FIGS. 6B-6D are enlarged perspective views of the corresponding enumerated areas of the top cover panel circled in FIG. 6A to further illustrate the curvature of the outer surface of the panel and the recessed region defined by the raised perimeter wall.

FIGS. 7B-7G are enlarged perspective views of the corresponding enumerated areas of the top cover panel circled in FIG. 7A to further illustrate the inner surface of the panel including the compartment defined thereby, the raised perimeter walls and the retention tabs extending inwardly from the inner surface of the panel.

FIGS. 8B, 8D, 8F, 8H and 8K are cross-sectional views taken along corresponding enumerated cross reference lines 8B-8B, 8D-8D, 8F-8F, 8H-8H and 8K-8K of the top cover panel as illustrated in FIG. 8A.

FIGS. 8C, 8E, 8G, 8I, 8J and 8L are enlarged perspective views of corresponding enumerated areas of the cross-sectional views of the top cover panel encircled in FIGS. 8B, 8D, 8F, 8H and 8K, respectively. For reference, the fabric/leather layer is shown in phantom/broken lines.

FIGS. 11B-11E are enlarged perspective views of the corresponding enumerated areas of the bottom cover panel circled in FIG. 11A to further illustrate the curvature of the outer surface of the panel, the footing platforms, ventilation and access apertures, and the recessed region defined by the raised perimeter wall.

FIGS. 13B, 13D, 13F, 13H, 13J and 13M are cross-sectional views taken along corresponding enumerated cross reference lines 13B-13B, 13D-13D, 13F-13F, 13H-13H, 13J-13J and 13M-13M of the bottom cover panel as illustrated in FIG. 13A.

FIGS. 13C, 13E, 13G, 13I, 13K, 13L, 13N and 13P are enlarged perspective views of corresponding enumerated areas of the cross-sectional views of the top cover panel encircled in FIGS. 13B, 13D, 13F, 13H, 13J and 13K, respectively. For reference, the fabric/leather layer is shown in phantom/broken lines.

DETAILED DESCRIPTION

Figure 1A:
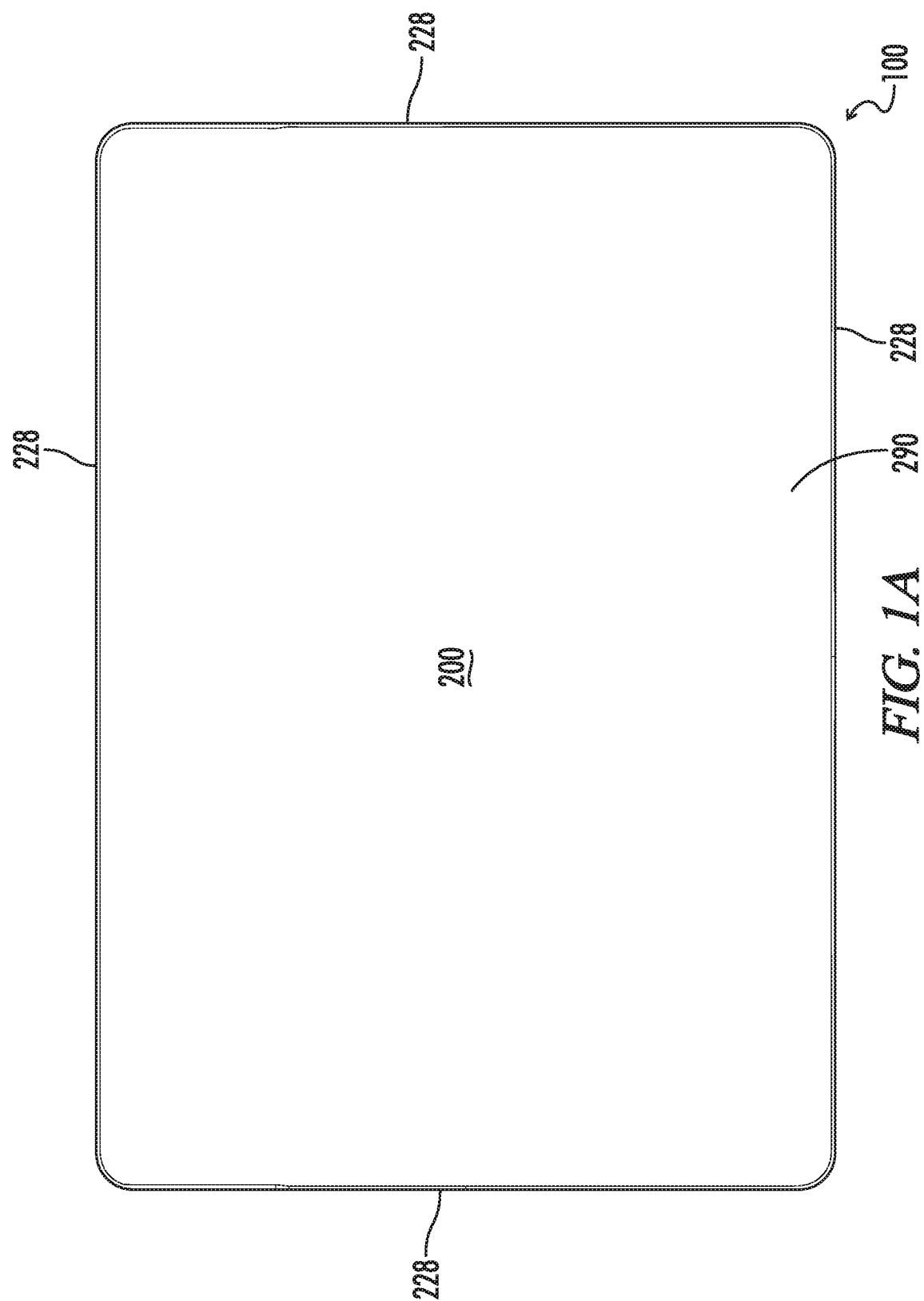

It should be understood that the embodiments illustrated and described herein are examples and not limiting. In the drawings like reference numerals refer to like parts throughout, which include:

REFERENCE NUMERALS

Laptop computer 10
display portion 20
  inner surface 21
  outer surface 22
keyboard portion 30
  inner surface 31
  outer surface 32
User interfaces (e.g., ports, jacks, etc.) 33
Exterior cover 100
Top cover 200
  Top cover panel 220
    Outer surface 221
    Inner surface 222
      Display portion compartment 225
      Retention tabs 227
      Perimeter edge region 223
        Raised Perimeter lip 228
          Raised surface 229
          Proximate side 230
          opposing outer side 231
      Recessed region 240
    Fabric/leather overlay 290
Bottom cover 300
  Bottom cover panel 320
    Outer surface 321
    Inner surface 322
      Keyboard portion compartment 325
      Retention tabs 327

Internally extending curved retention lip 326
Perimeter edge region 323
Raised Perimeter lip 328
Raised surface 329
Proximate side 330
Opposing outer side 331
Recessed region 340
Ventilation apertures 350
Outwardly protruding ventilation aperture walls 355
Raised ventilation aperture wall surface 359
Proximate side 360
Opposing internal side 361
Outwardly protruding footing platforms 370
Opposing recessed regions 371
Foot attachment holes 372
Support foot 380
Internal portion 381
External portion 382
Fabric/leather overlay 390

Described and illustrated herein is a portable electronic device cover that is capable of being light weight, durable, and user friendly while also blurring the lines between soft and hard shell cases by providing aesthetically pleasing surfaces found in cut-and-sew soft shell covers with the simplicity and durability of hard shell cases.

Figure 1B:
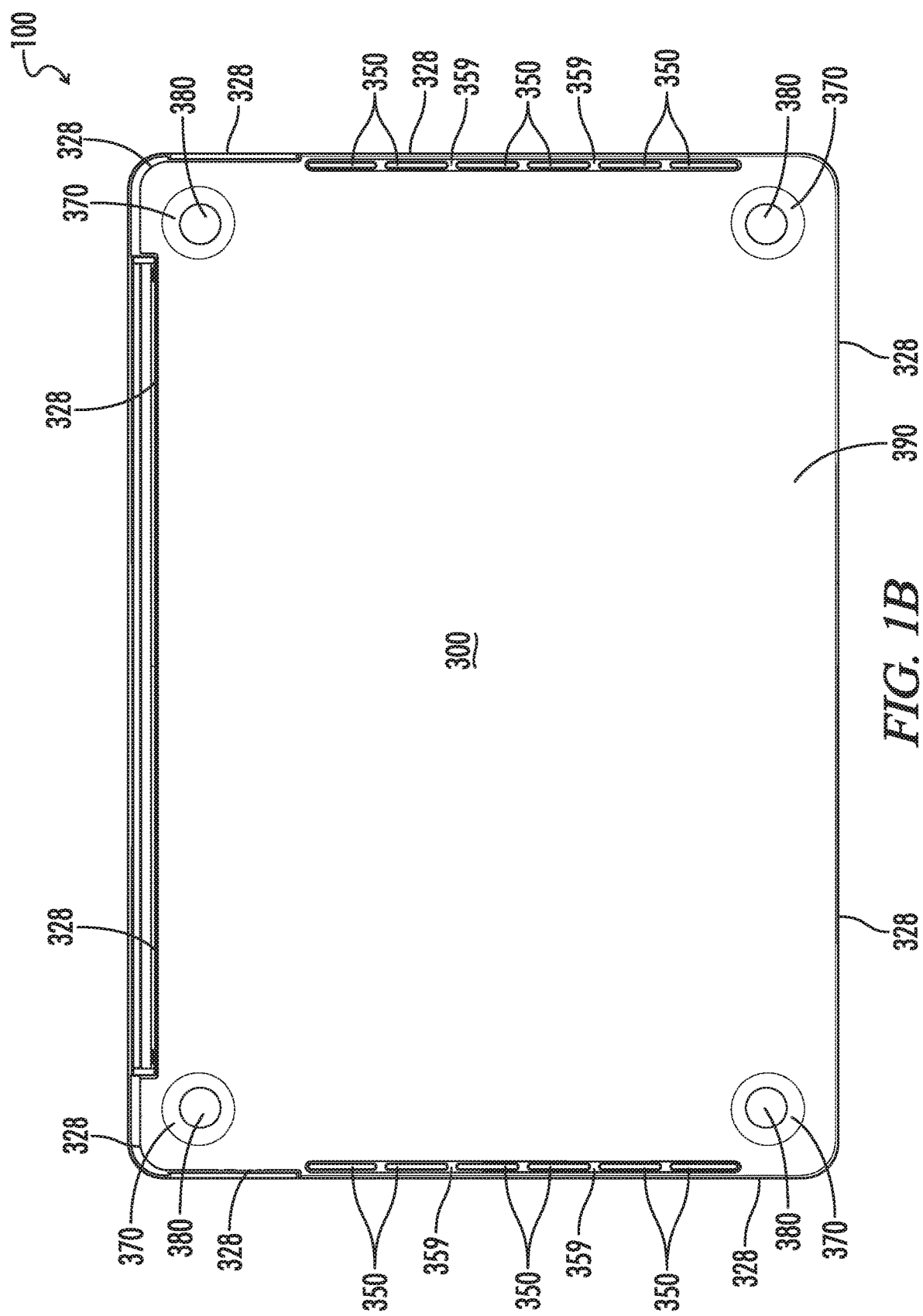
Figure 2A:
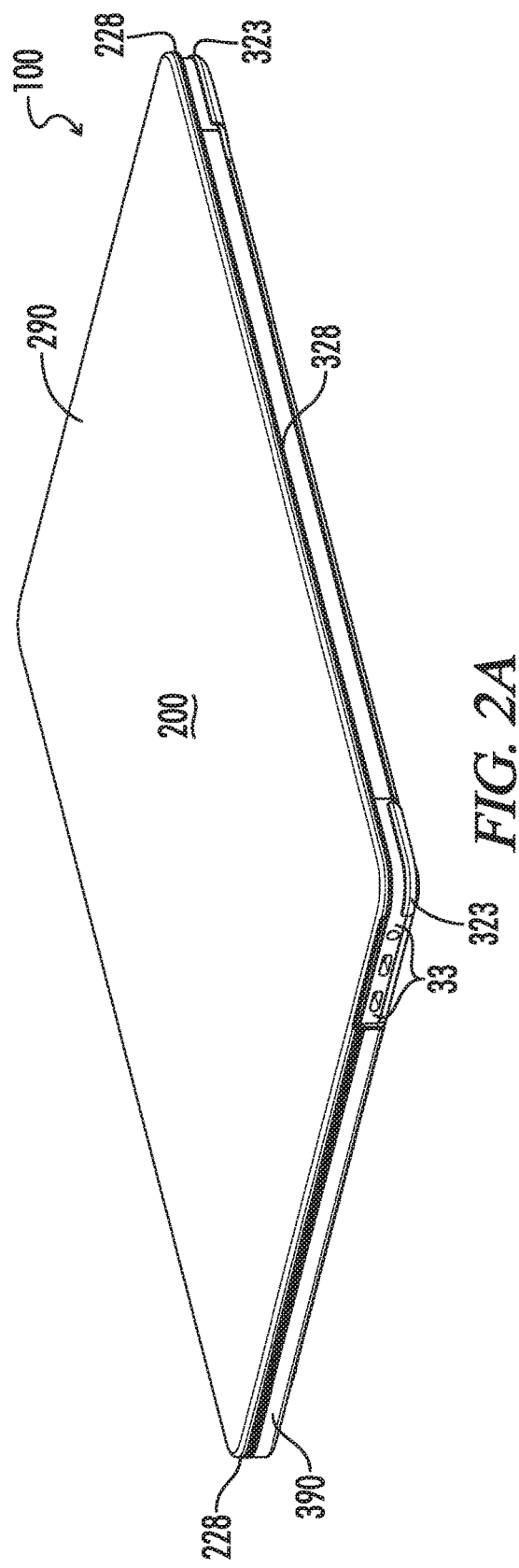
FIG. 2A is a top rear-right perspective view of the cover illustrated in FIGS. 1A-1F.
Figure 2B:
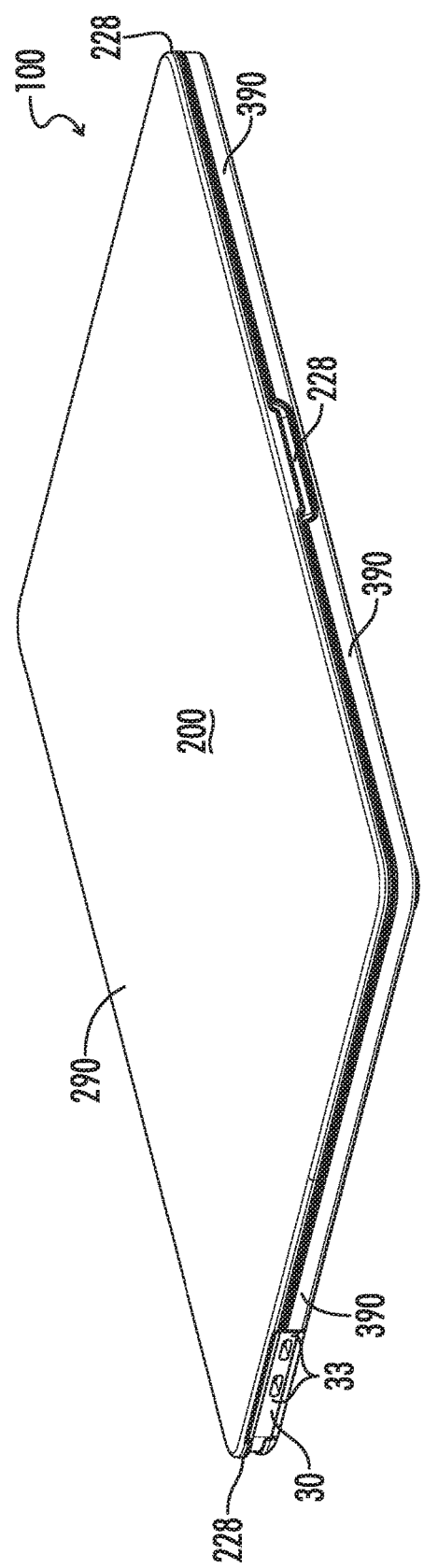
FIG. 2B is a top front-left perspective view of the cover illustrated in FIGS. 1A-1F.
Figure 3A:
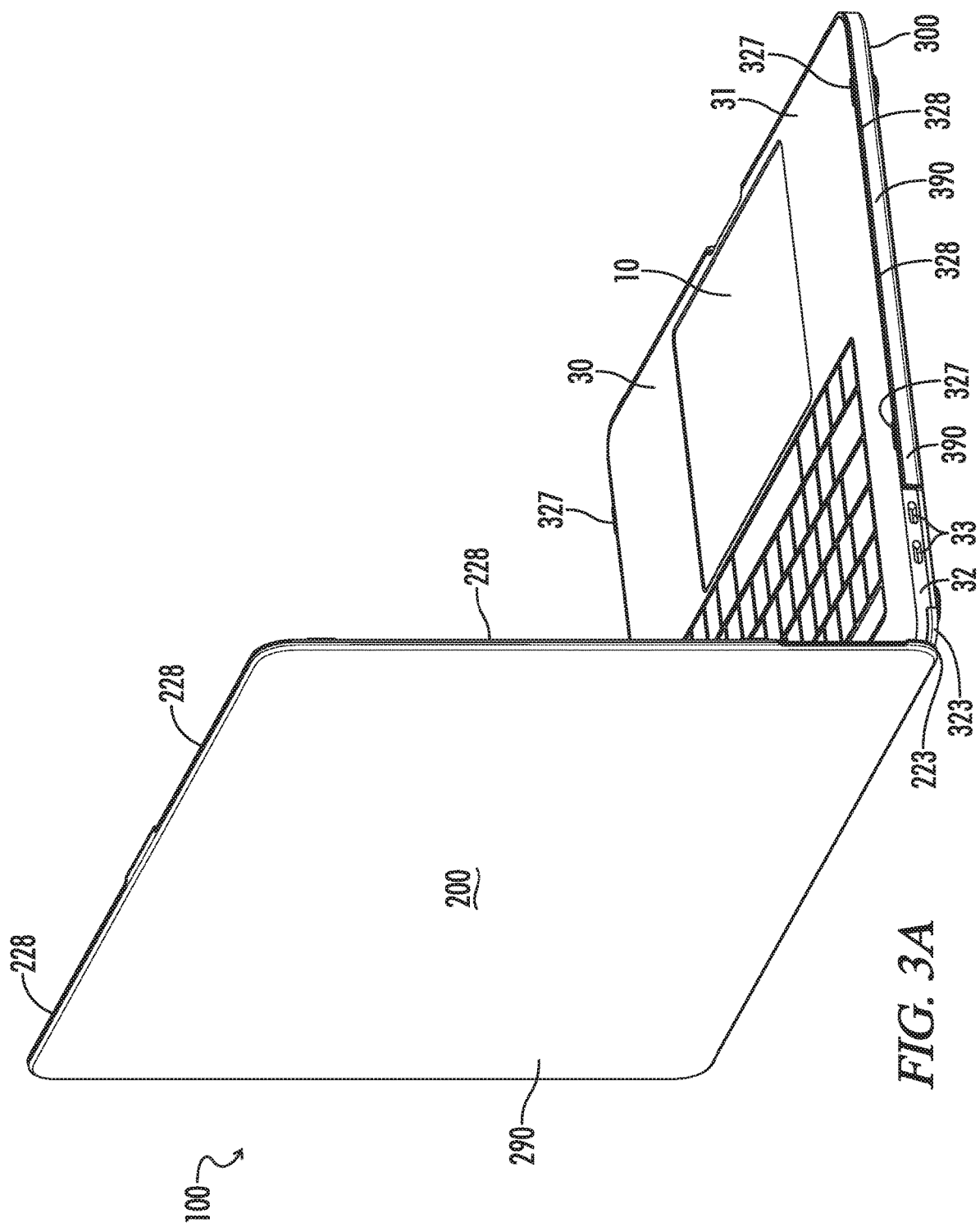
FIG. 3A is a top rear-left perspective view of the cover illustrated in FIGS. 1A-1F with the laptop display portion in an open position.
Figure 3B:
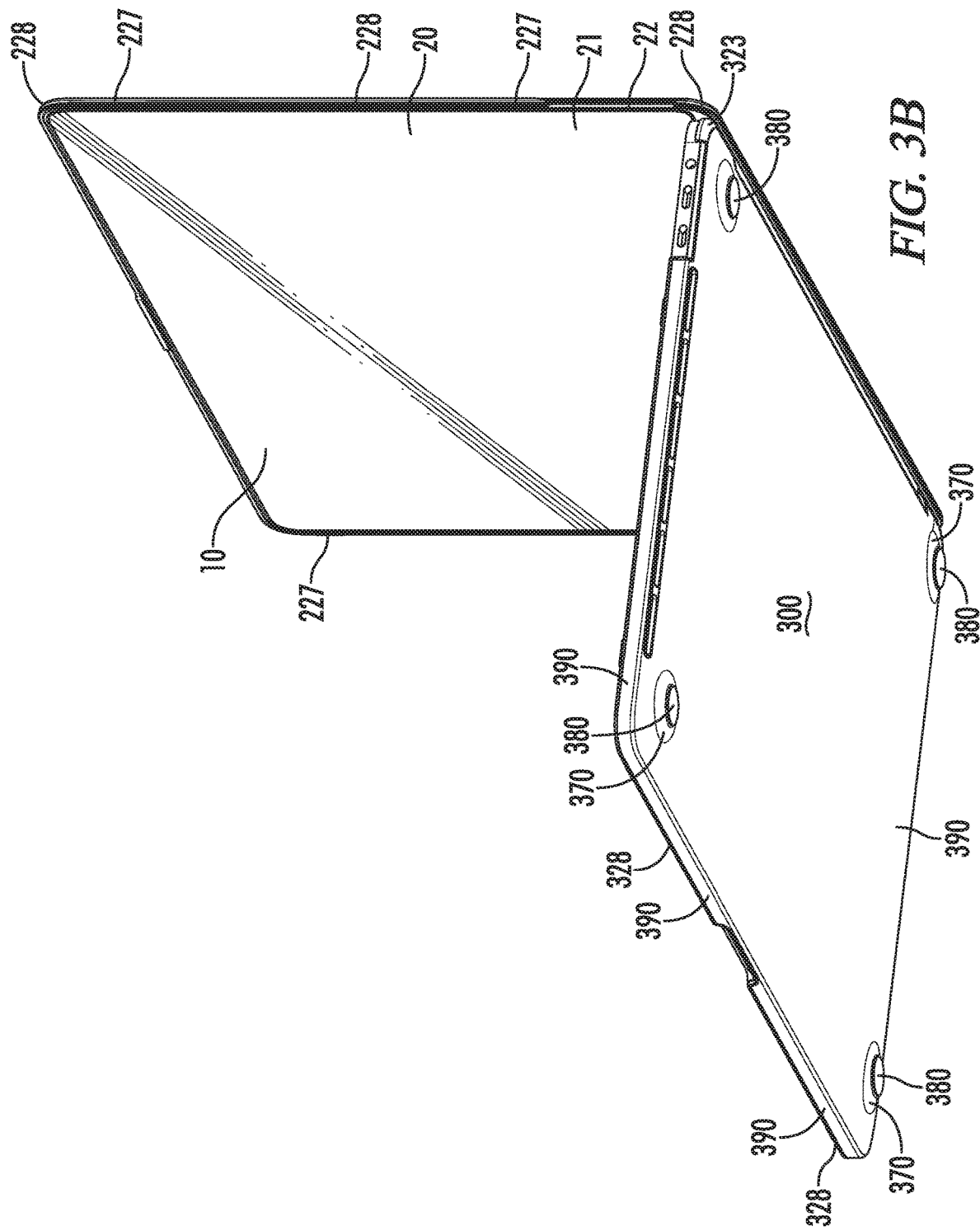
FIG. 3B is a bottom front-right perspective view of the cover illustrated in FIGS. 1A-1F with the laptop display portion in an open position.
Figure 4A:
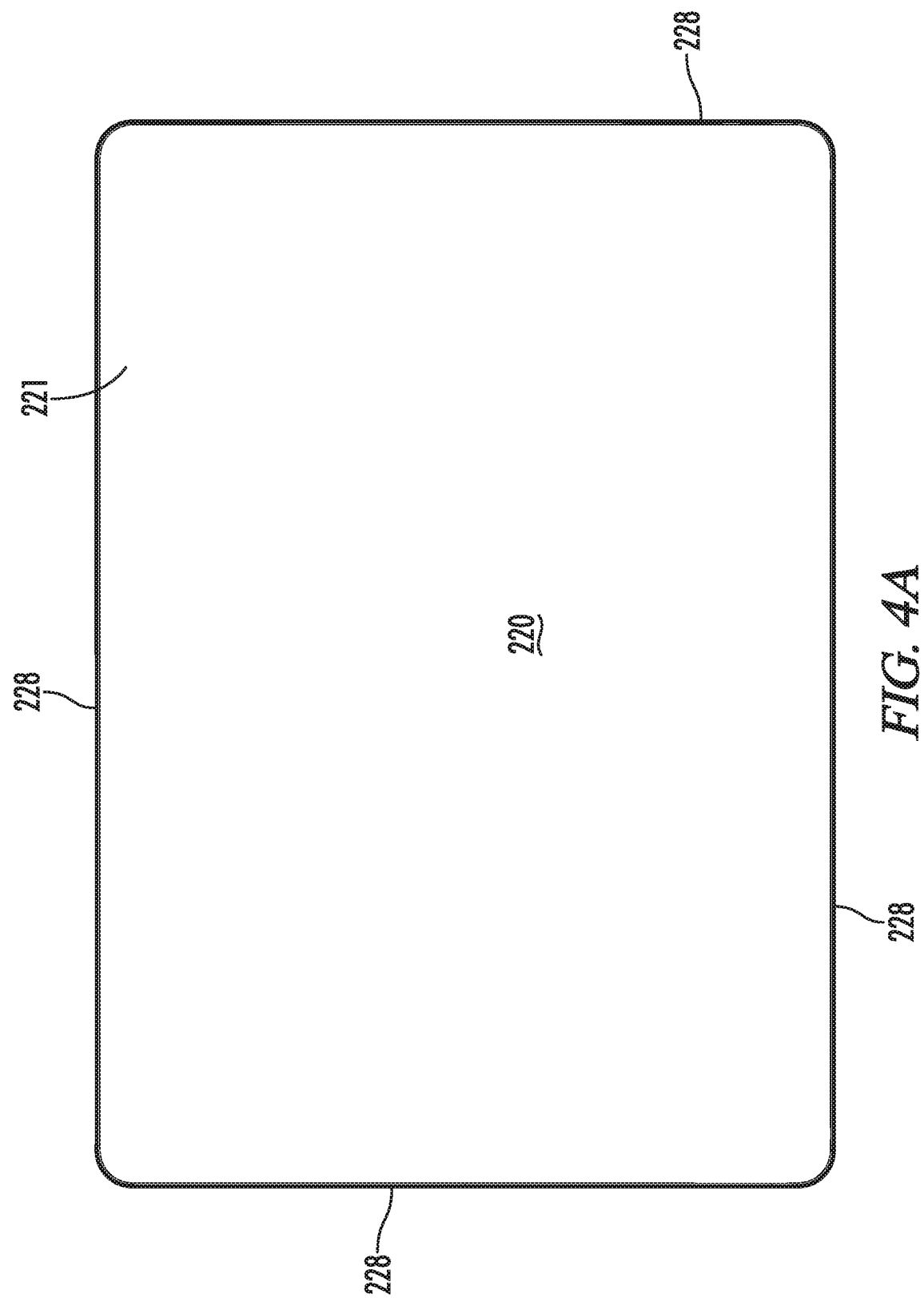
FIG. 4A is an exterior view of the top cover component of the laptop cover illustrated in FIGS. 1A-1F, with the fabric/leather overlay removed to reveal the outer surface of the top cover panel.
Figure 5A:
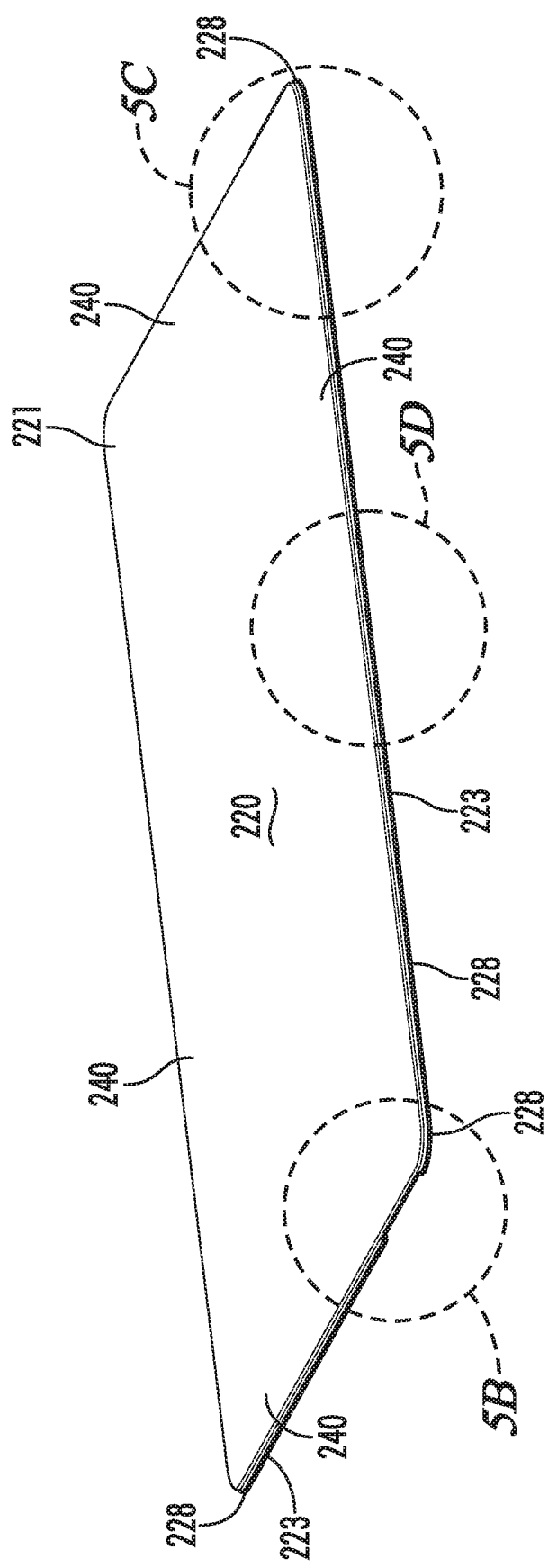
FIG. 5A is an exterior rear-right perspective view of the top cover panel illustrated in FIGS. 4A-4B.
Figure 6A:
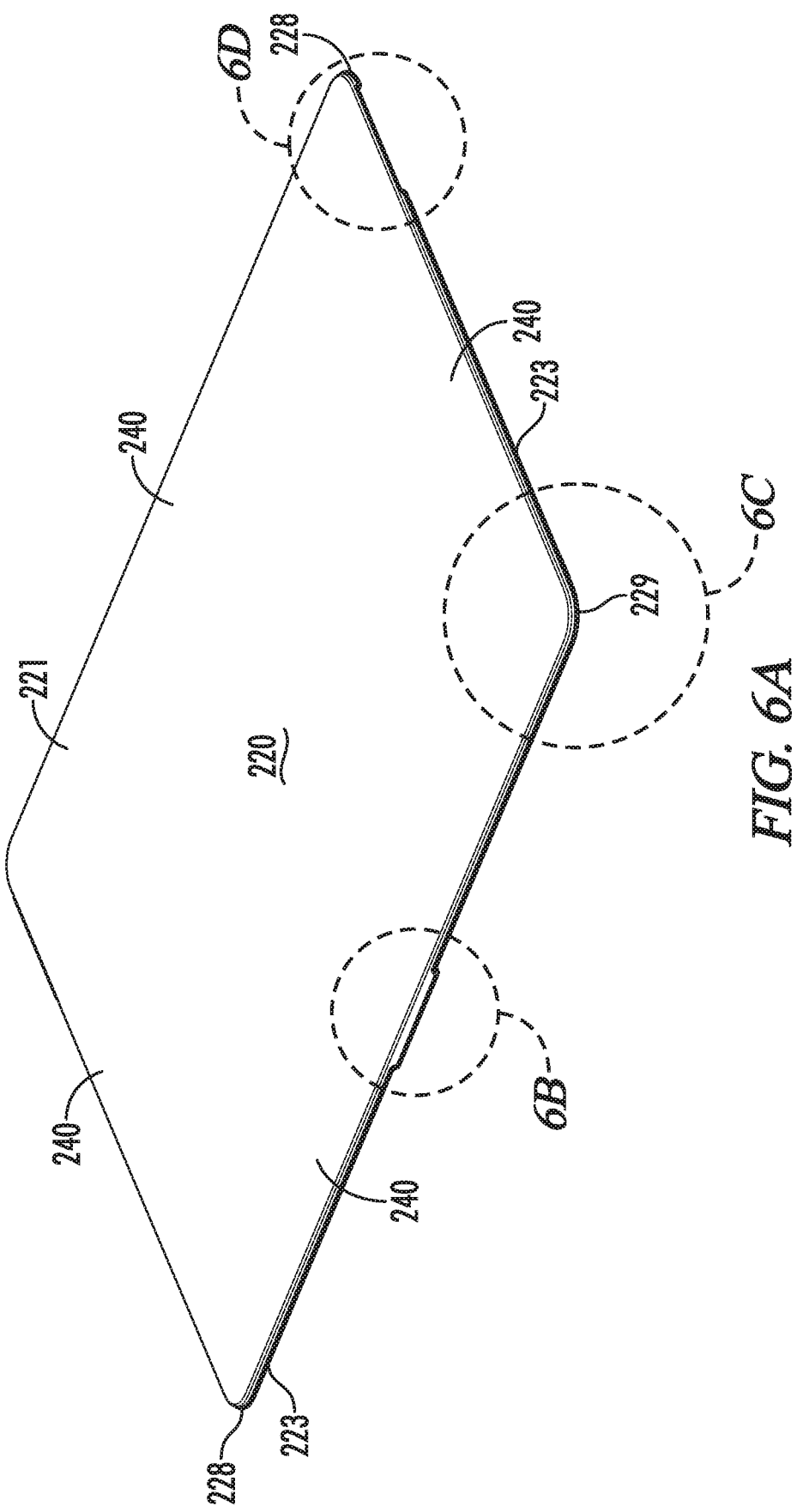
FIG. 6A is an exterior front-right perspective view of the top cover panel illustrated in FIGS. 4A-4B.
Figure 7A:
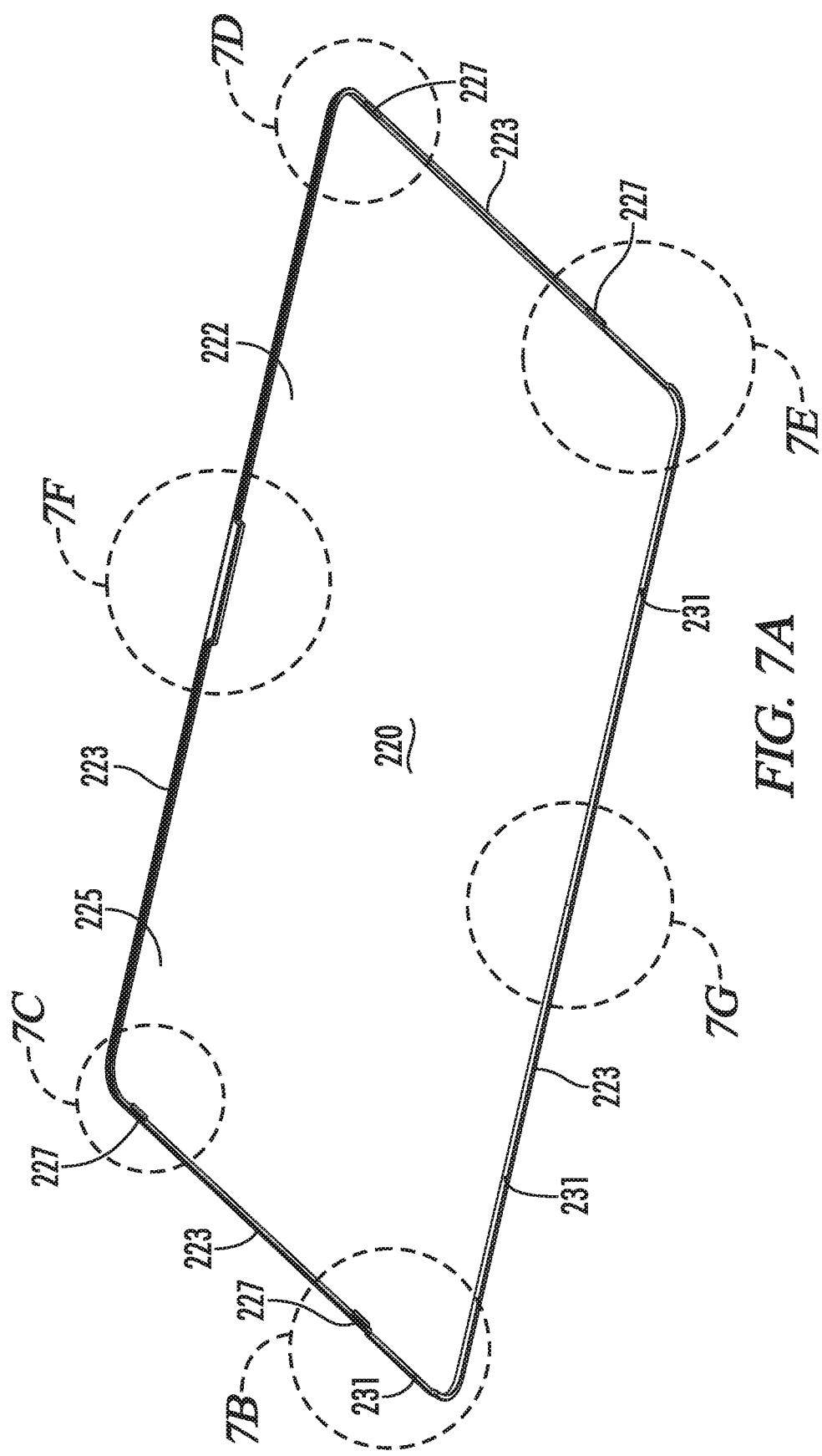
FIG. 7A is an interior rear-right perspective view of the top cover panel illustrated in FIGS. 4A-4B.
Figure 7D:
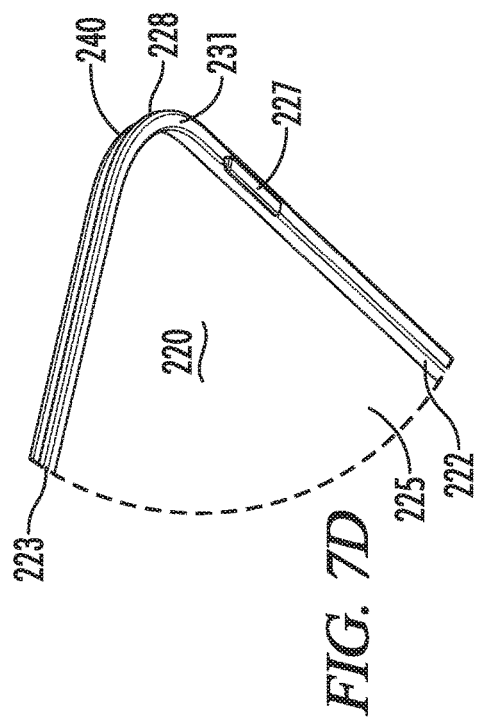
Figure 7E:
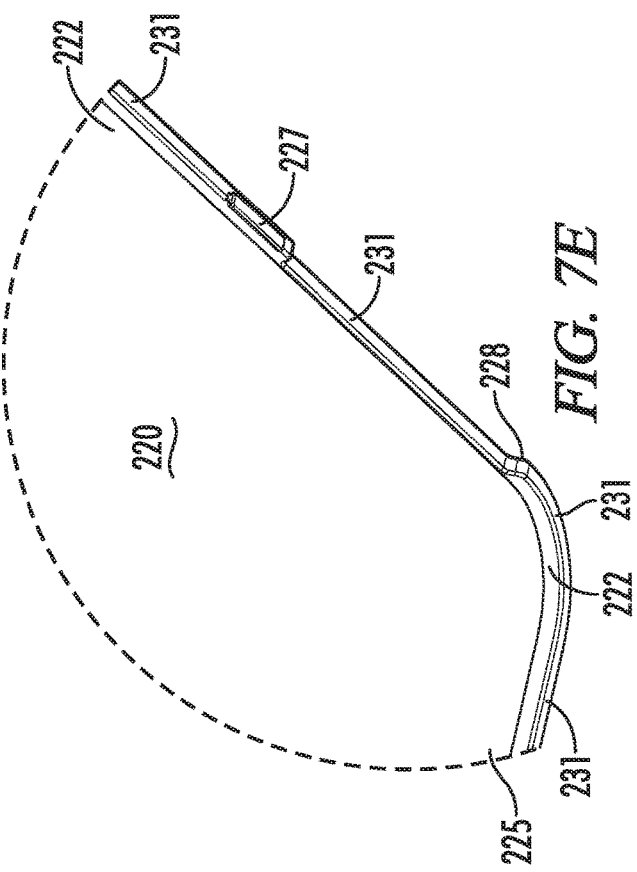
Figure 7C:
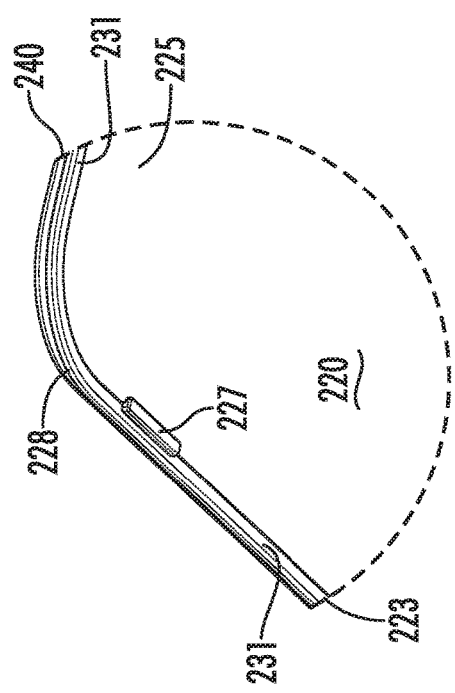
Figure 7B:
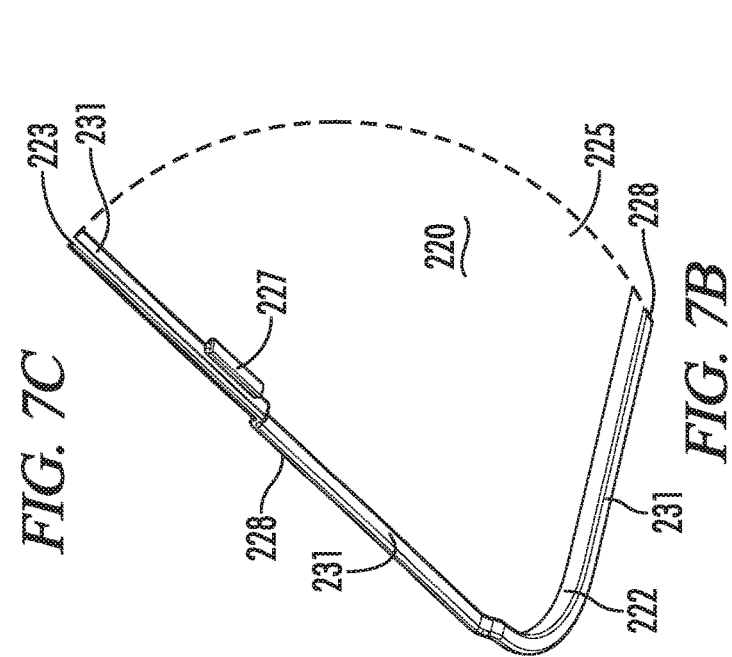
Figure 8A:
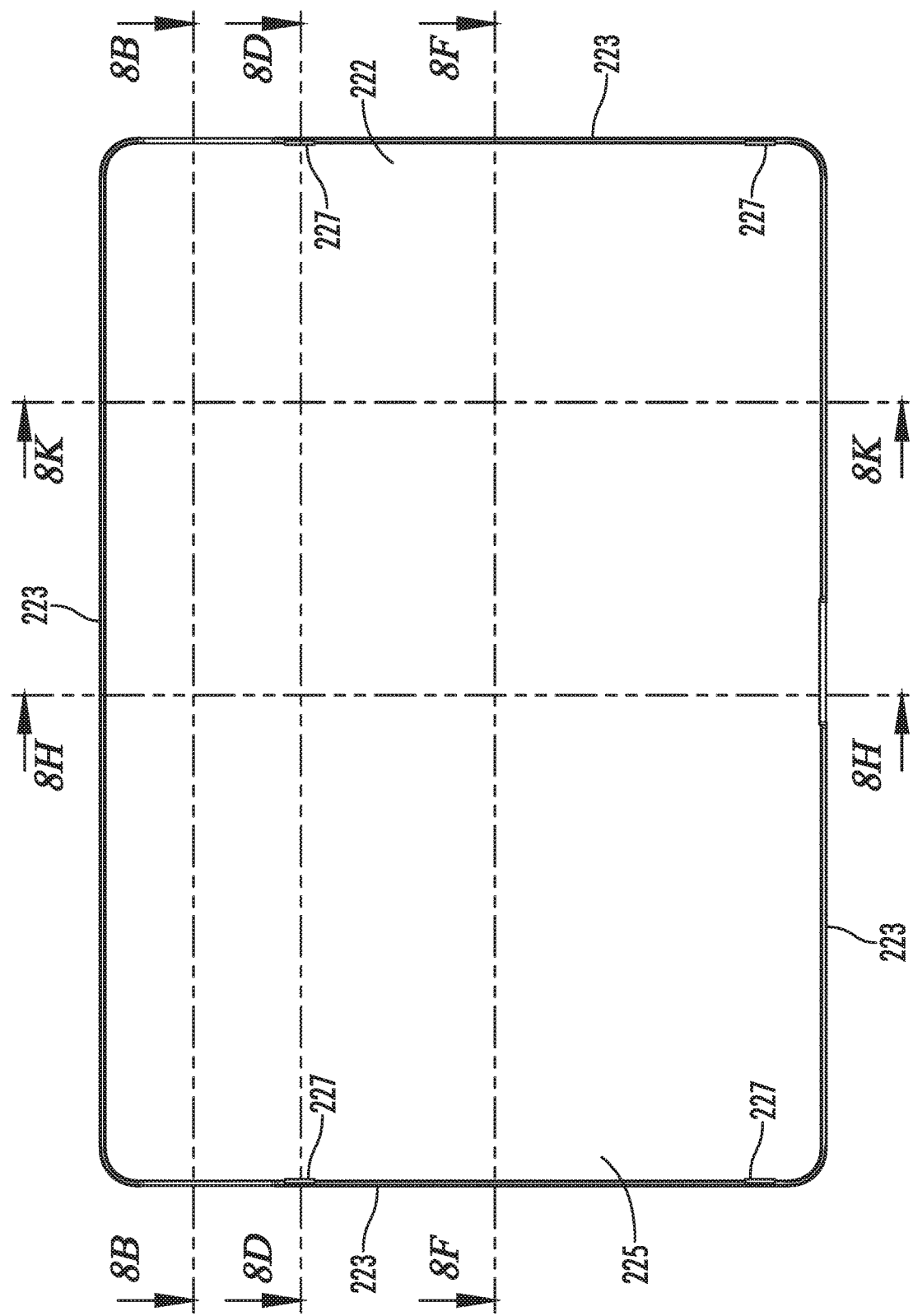
FIG. 8A is a duplicate of FIG. 4B with cross-sectional reference lines added.

As set forth above, FIGS. 1A-16 illustrate various aspects of an exterior cover 100 formed and dimensioned to reversibly and retentively receive and protect a laptop computer 10 having a display portion 20 and a keyboard portion 30 (best illustrated in FIGS. 1-3). The display portion 20 and keyboard portion are each externally defined by inner and outer surfaces 21, 22, 31, 32 respectively, such that the inner surfaces 21, 31 include the display screen on the display portion 20 and the keyboard interface face on the keyboard portion 30 such that when the laptop 10 is in the closed position the two inner surfaces 21 and 31 are opposed and directly face each other as best illustrated in FIGS. 1-3 and 16. As best illustrated in the side views of FIGS. 1E-3B, the keyboard portion, for the particular laptop illustrated (Apple® 15-inch MacBook Pro® laptop computer), includes various user interfaces 33 on its right and left sides. Such user interfaces may be ports, jacks, speakers, microphones or other electrical, mechanical, optical, and/or acoustic connectors or interfaces. It should be understood that other laptop models may have user interfaces on the display portion 20 and in other regions or sides. It should be understood that the cover 100 is configured to correspond to the outer shape and user interfaces of the particular electronic device for which it is adapted for use.

The cover 100 includes a top cover 200 and a bottom cover 300. The top cover 200 includes a top cover or first panel 220 that is configured to cover the outer surface 22 of the display portion 20 and the bottom cover 300 includes a bottom cover or second panel 320 configured to cover the outer surface 32 of the keyboard portion 30. Each of said panels 220, 320 being independent and separate from one another and each panel being formed as a unitary component of a molded resilient polymer material dimensioned to reversibly and retentively snap-fit over the display portion 20 and keyboard portion 30, respectively. Thus, the cover 100 is to include snap fit design that is configured for a multiple use, such that the user can attach and remove the cover 100 from the electronic device multiple times while retaining functionality of the cover 100.

The top panel 220 includes a large generally planar wall that is configured to cover and protect the back face of the display portion 20 and multiple side walls that extend generally perpendicular to the generally planar wall that are configured to cover and protect the sides of the display portion 10. Similarly, the bottom panel 320 include a large generally planar wall that is configured to cover and protect the back face of the keyboard portion 30 and multiple side walls that extend generally perpendicular thereto that are configured to cover and protect the sides of the keyboard portion 30.

The top panel 220, which is illustrated as a stand-alone component in FIGS. 4A-8L, is defined by inner and opposing outer surfaces 222, 221, respectively, that are separated by a perimeter edge region 223. The inner surface 222 of the top panel 220 defines a compartment 225 dimensioned to receive and cover the outer surface 22 of the display portion 20 of the laptop computer 10. The bottom panel 320, which is illustrated as a stand-alone component in FIGS. 9A-13P, is also defined by inner and opposing outer surfaces 322, 321, respectively, that are separated by a perimeter edge region 323. The inner surface 322 of the top panel 320 defines a compartment 325 dimensioned to receive and cover the outer surface 32 of the keyboard portion 30 of the laptop computer 10.

Figure 9A:
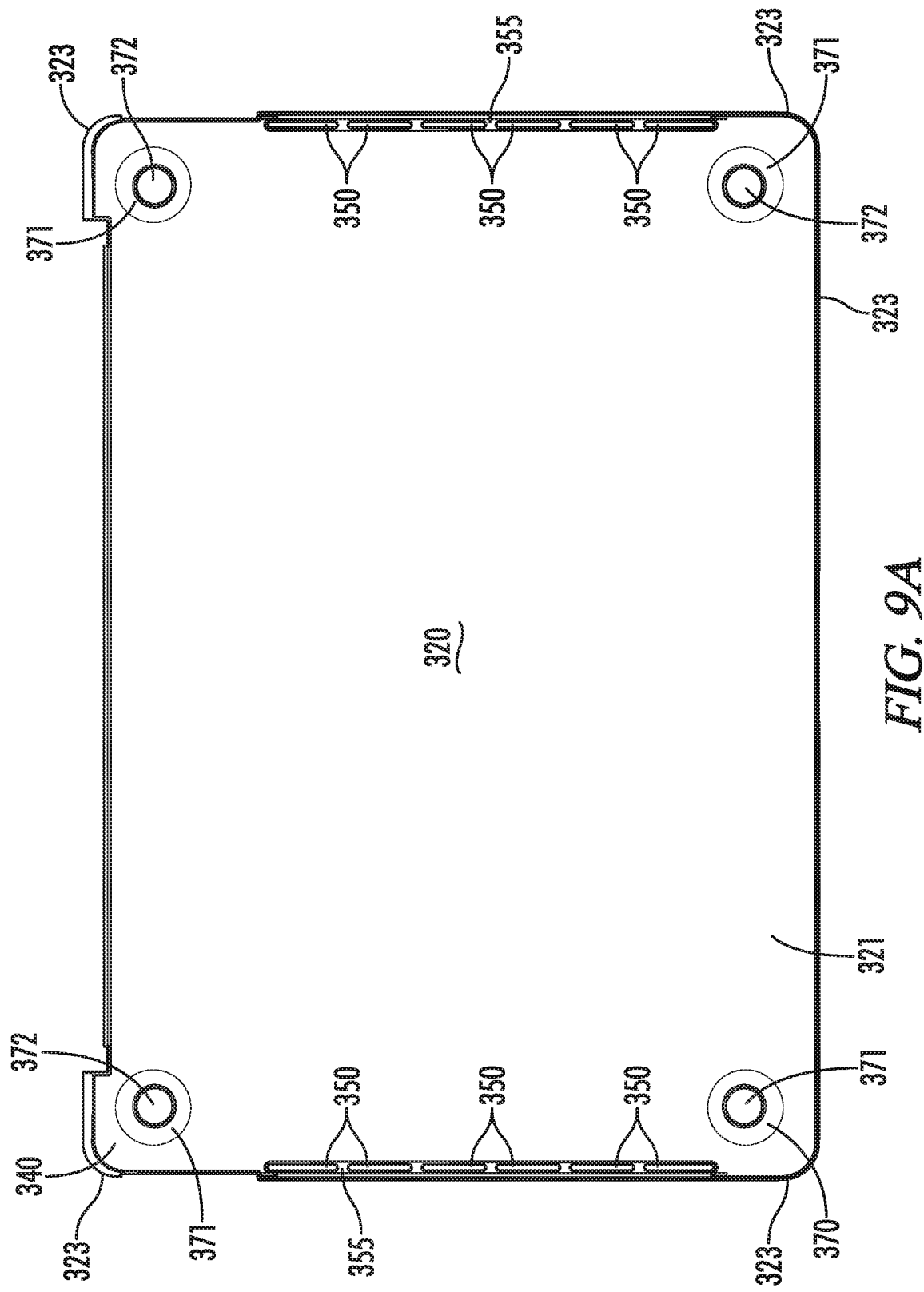
FIG. 9A is an exterior view of the bottom cover component of the laptop cover illustrated in FIGS. 1A-1F, with the support feet and the fabric/leather overlay removed to reveal the outer surface of the bottom cover panel and the foot attachment holes.
Figure 9B:
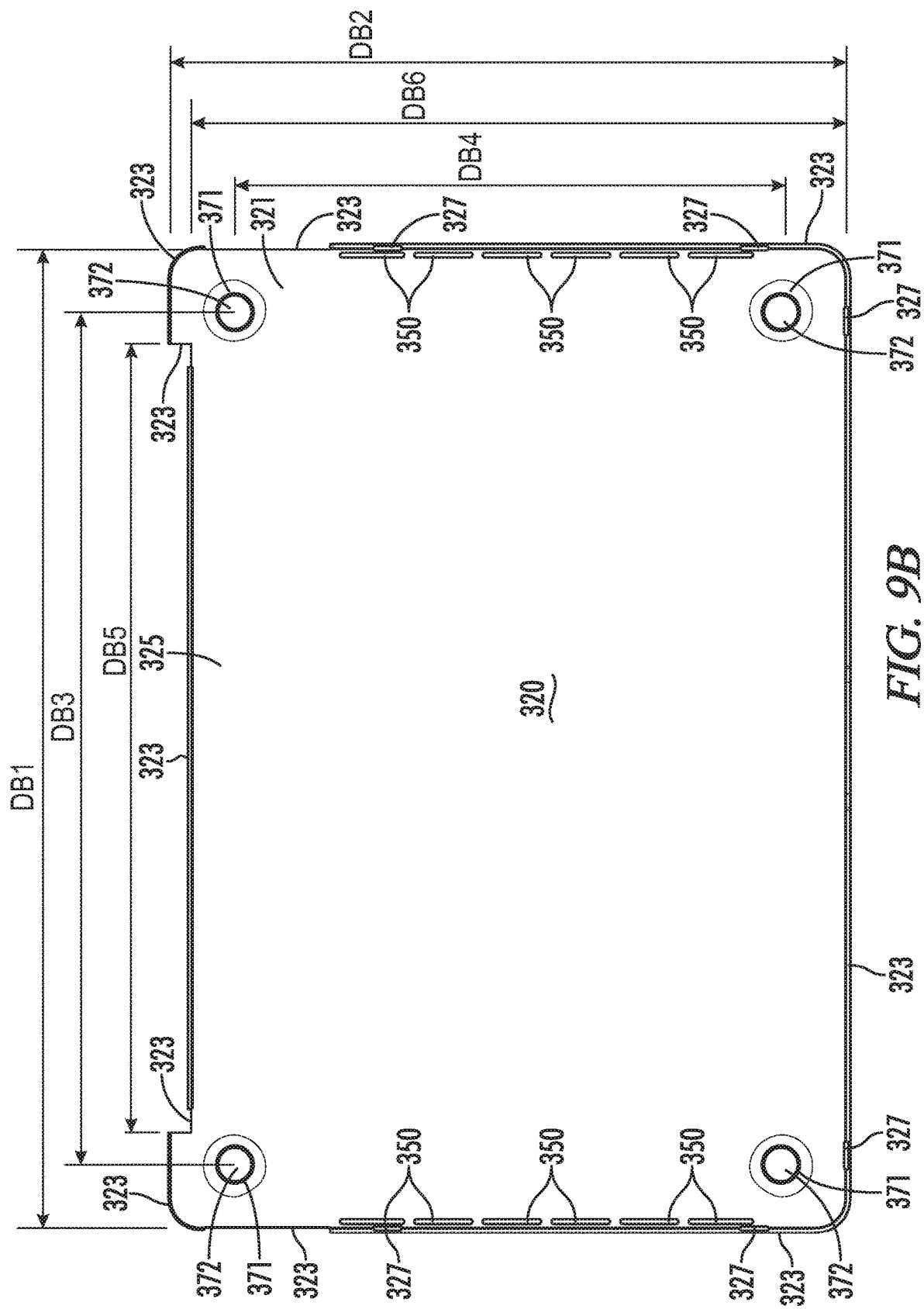
FIG. 9B is an interior view of the display cover illustrated in FIG. 9A with the keyboard portion of the laptop computer removed to reveal the inner surface of the bottom cover panel. DB1-DB6 define the various length and width of the keyboard compartment and the position of the footing platforms defined by the inner surface of the bottom cover panel.
Figure 9C:
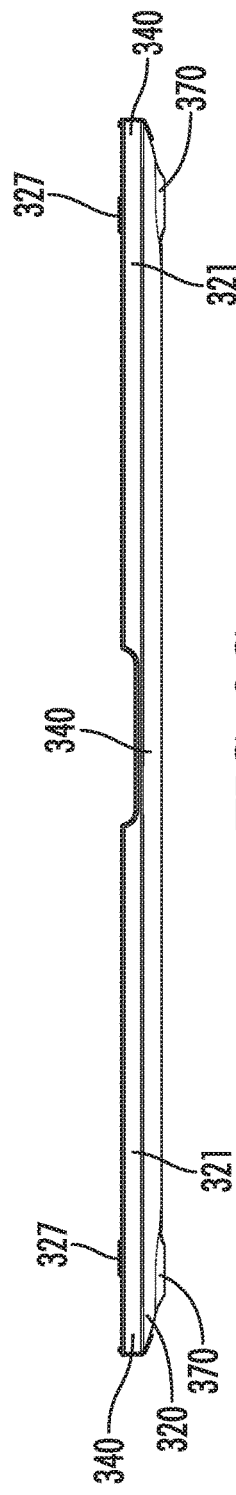
FIGS. 9C-9F are the front, rear, left and right views, respectively, of the bottom cover panel illustrated in FIG. 9A.
Figure 9D:
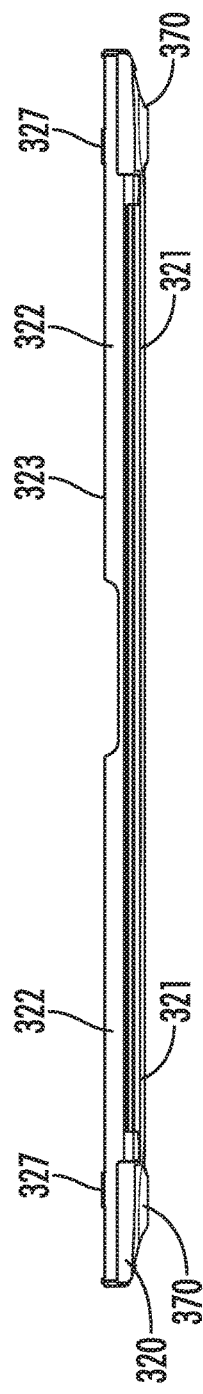
Figure 9E:
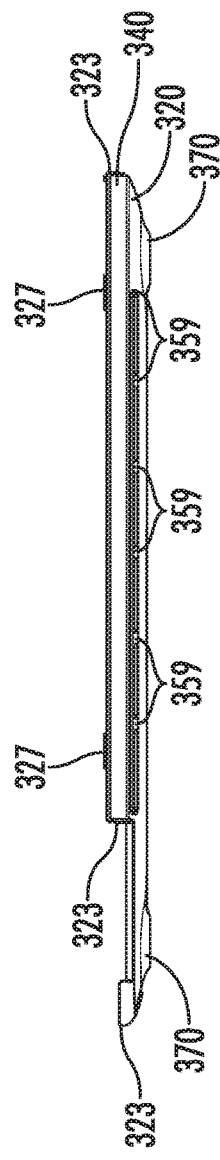
Figure 9F:
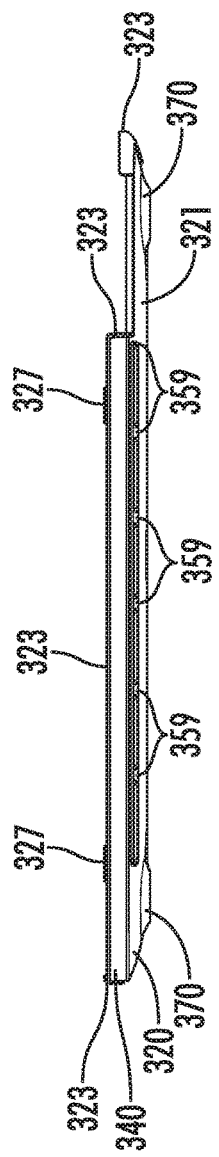
Figure 10A:
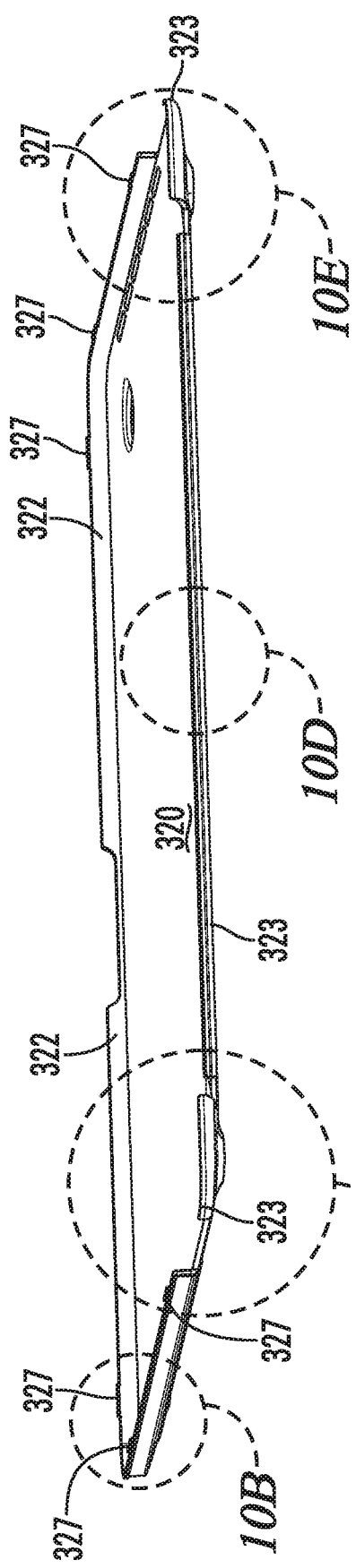
FIG. 10A is an interior rear-right perspective view of the top cover panel illustrated in FIGS. 9A-9F.
Figure 10B:
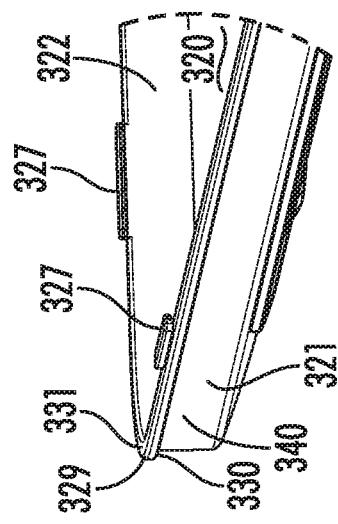
FIGS. 10B-10E are enlarged perspective views of the corresponding enumerated areas of the bottom cover panel circled in FIG. 10A to further illustrate the curvature of the surfaces of the panel, the keyboard compartment defined therein, the retention tabs and the raised perimeter wall that defines the recessed region on the outer surface of the panel.
Figure 10C:
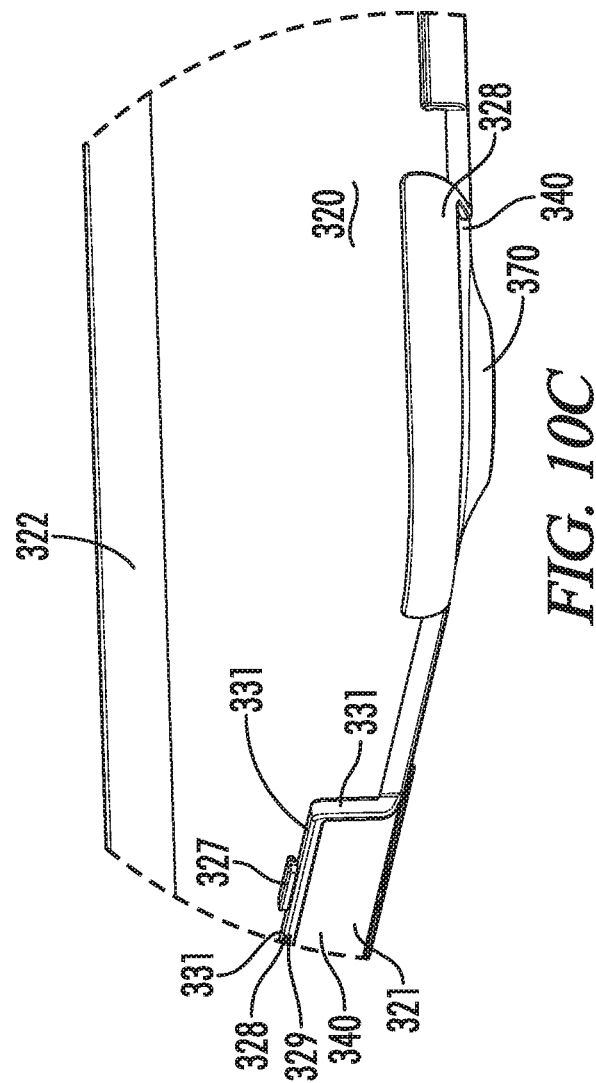
Figure 10D:
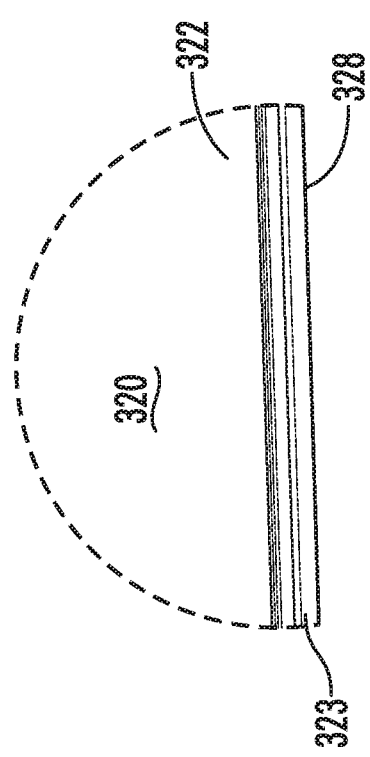
Figure 10E:
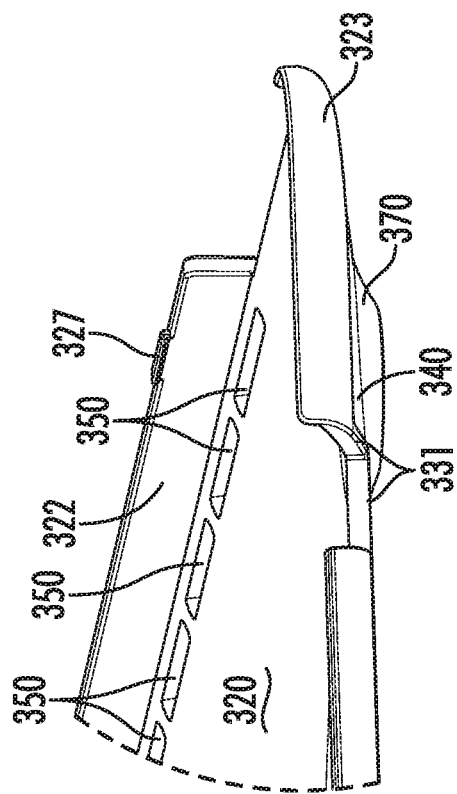
Figure 16:
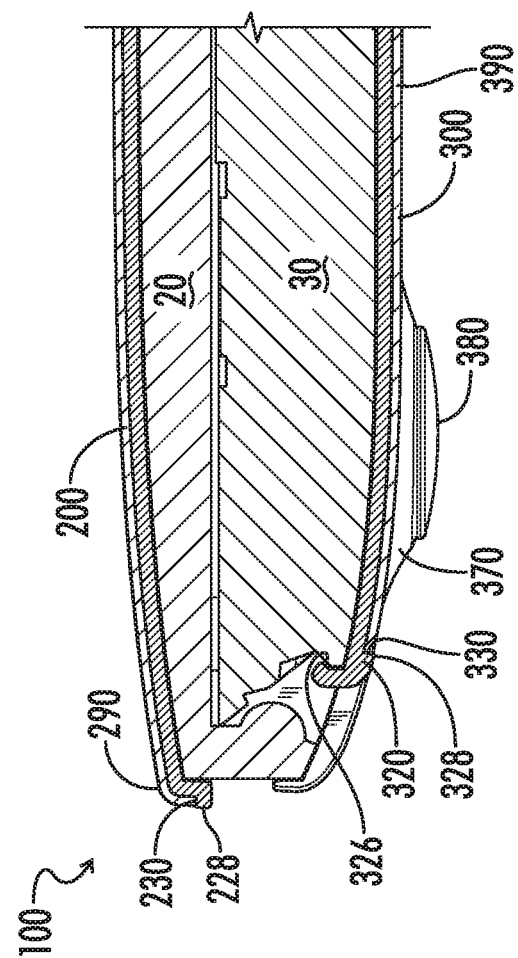
FIG. 16 is an enlarged partial cross sectional view taken along line 16-16 in FIG. 1C illustrating the internal contour of the cover relative to the laptop computer including the hinge portion thereof.
Figure 13A:
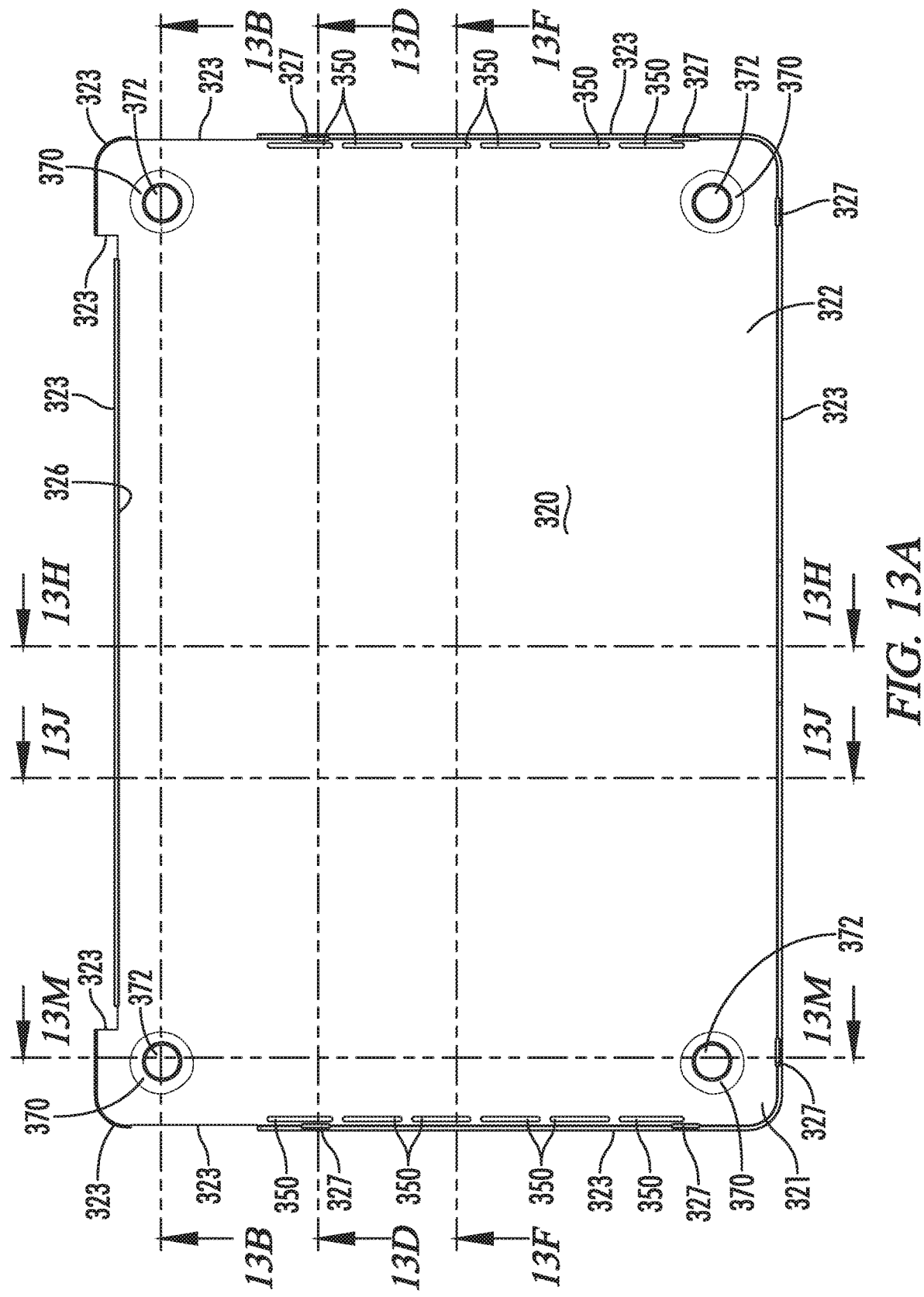
FIG. 13A is a duplicate of FIG. 9B with cross-sectional reference lines added.

Each of the top and bottom panels 220, 320 include a first plurality of retention tabs 227, 327 located at their respective perimeter edge regions 223, 323 that extend inwardly from the their respective inner surfaces 222, 322 in a transverse direction therefrom. The retention tabs 227, 327 are dimensioned to engage the corresponding inner surfaces 21, 31 of the display and keyboard portions 20, 30 of the laptop computer 10 when attached thereto. FIGS. 3A-3B illustrate the retention tabs 227, 327 in place over the inner surfaces 21, 31 of the of the display and keyboard portions 20, 30 of the laptop computer 10. As best illustrated in FIG. 4B, the top panel 220 includes two pairs of retention tabs 227, with one pair extending from the right side wall and another pair extending from left side wall of the top panel 220. In contrast, the bottom panel 320, as best illustrated in FIG. 9B, is configured to include three pairs of retention tabs 327, with a pair extending from each of the right, left and front side walls of the bottom panel 320. When the laptop computer 10 is in a closed position, the retention tabs 227 on the left and right side walls of the top panel 220 and the retention tabs 327 on the left and right side walls of the bottom panel 320 are configured to offset to each other and dimensioned to extend in limited length so that when the laptop computer 10 is closed the retention tabs 227, 327 would not affect the adaptation between the display and keyboard portions 20, 30. In addition, as best illustrated in FIG. 13K and FIG. 16, the internally facing perimeter edge region 323 that extends along the recessed back side wall of the bottom panel 320 includes an internally extending curved retention lip 326 that is configured to snap over a corresponding recessed region of the hinge of the laptop computer 10 to maintain the keyboard portion 30 within the keyboard compartment 325 and keep the keyboard from sliding out the back side of the bottom cover 300. The curved retention lip 326 is positioned below the retention tabs 327 to allow the user to more easily insert the keyboard from the back side of the bottom cover 300 and snap fit the keyboard portion 30 into the keyboard compartment 325 of the bottom cover panel 320 without tearing the cover panel 320 or damaging the keyboard. Similarly, including retention tabs on two opposing sides of the top panel 220 also allows the user to more easily insert and snap fit the top panel compartment 225 over display portion 20 without tearing the top panel 220 or damaging the display. Other retention tab configurations are contemplated. For example, additional or fewer retention tabs may be included. The retention tabs may be extend from different walls and may be of larger or smaller size.

Figure 11A:
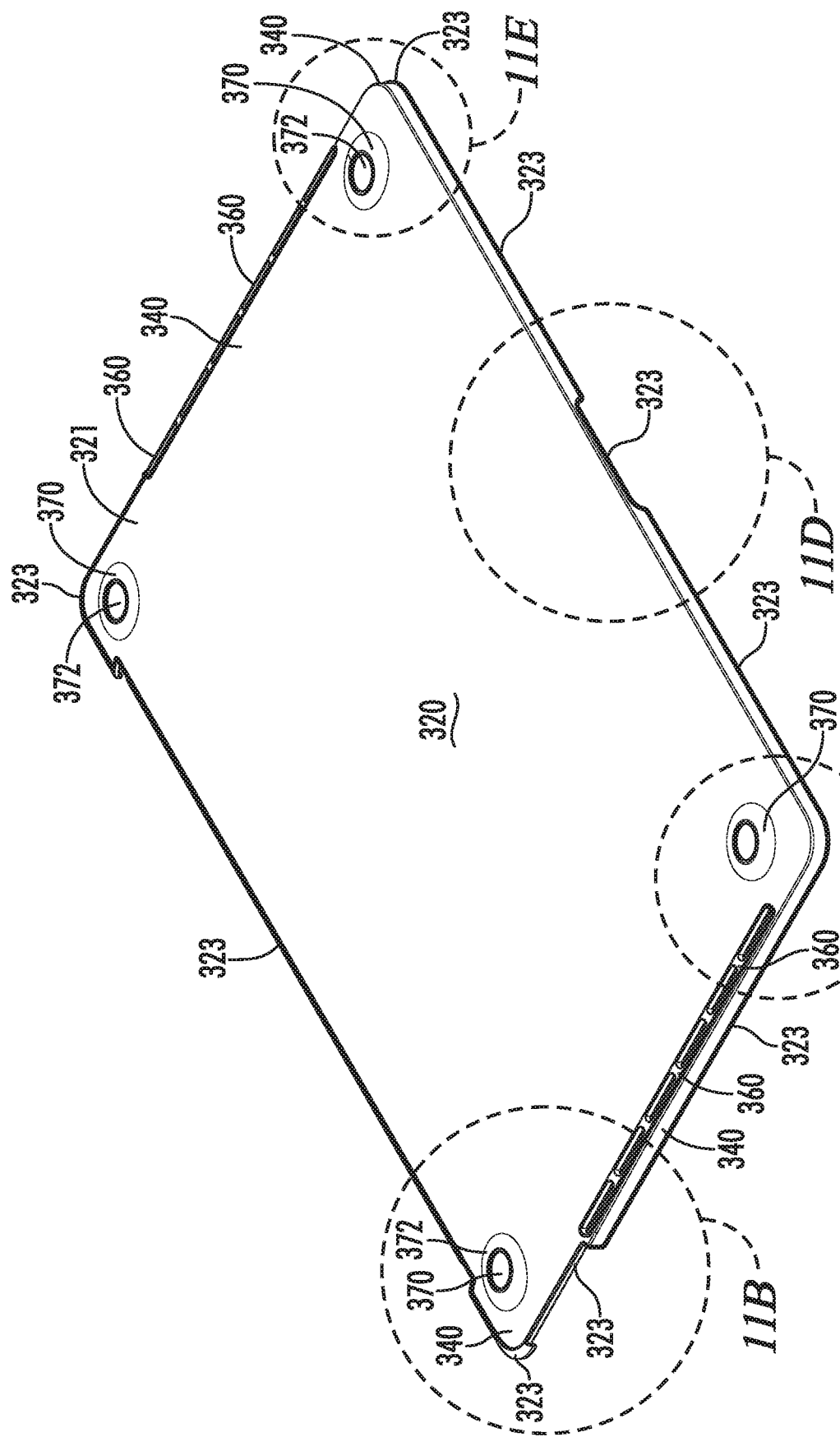
FIG. 11A is an exterior front-left perspective view of the bottom cover panel illustrated in FIGS. 9A-9F.
Figure 11B:
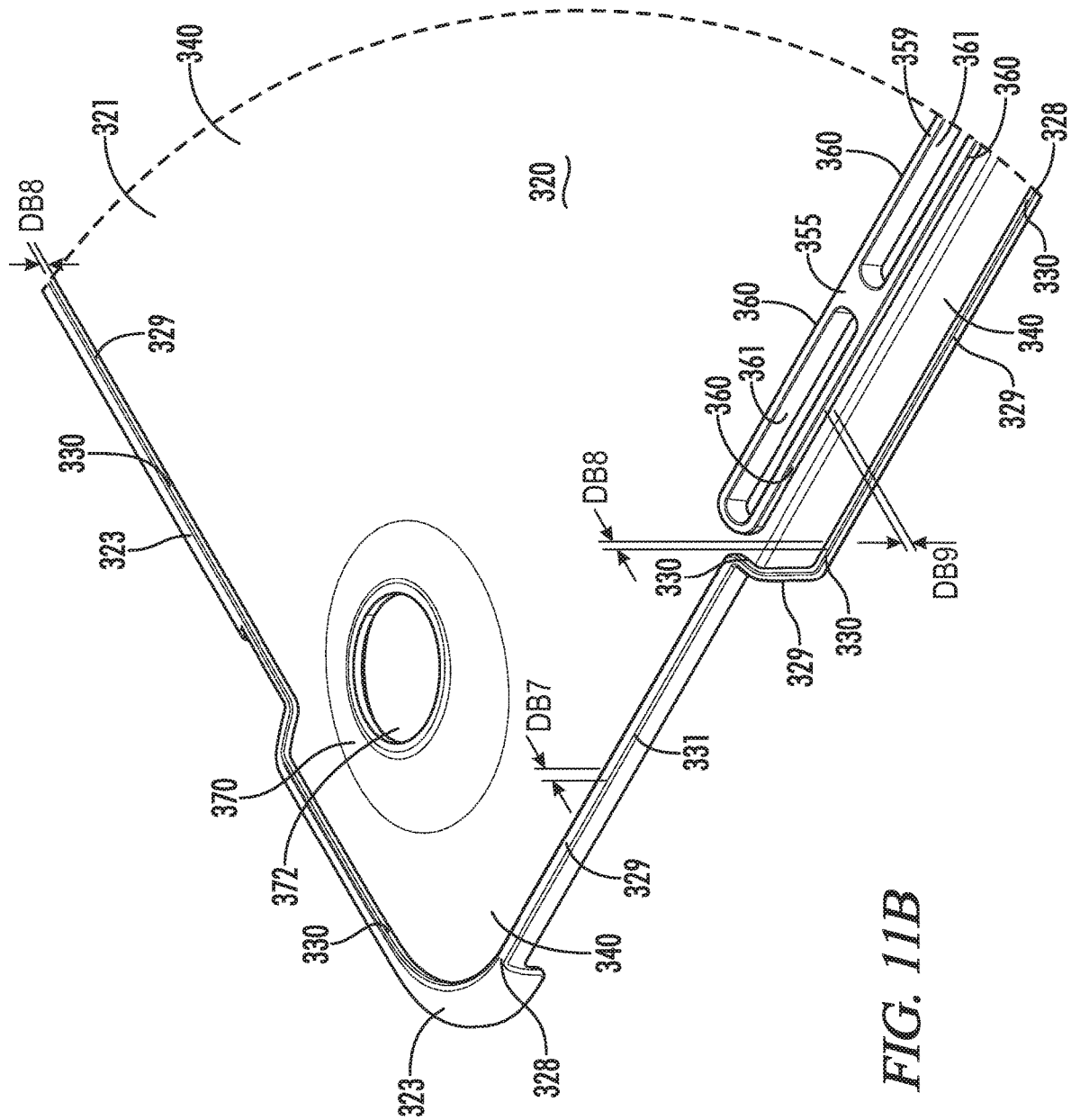
Figure 12A:
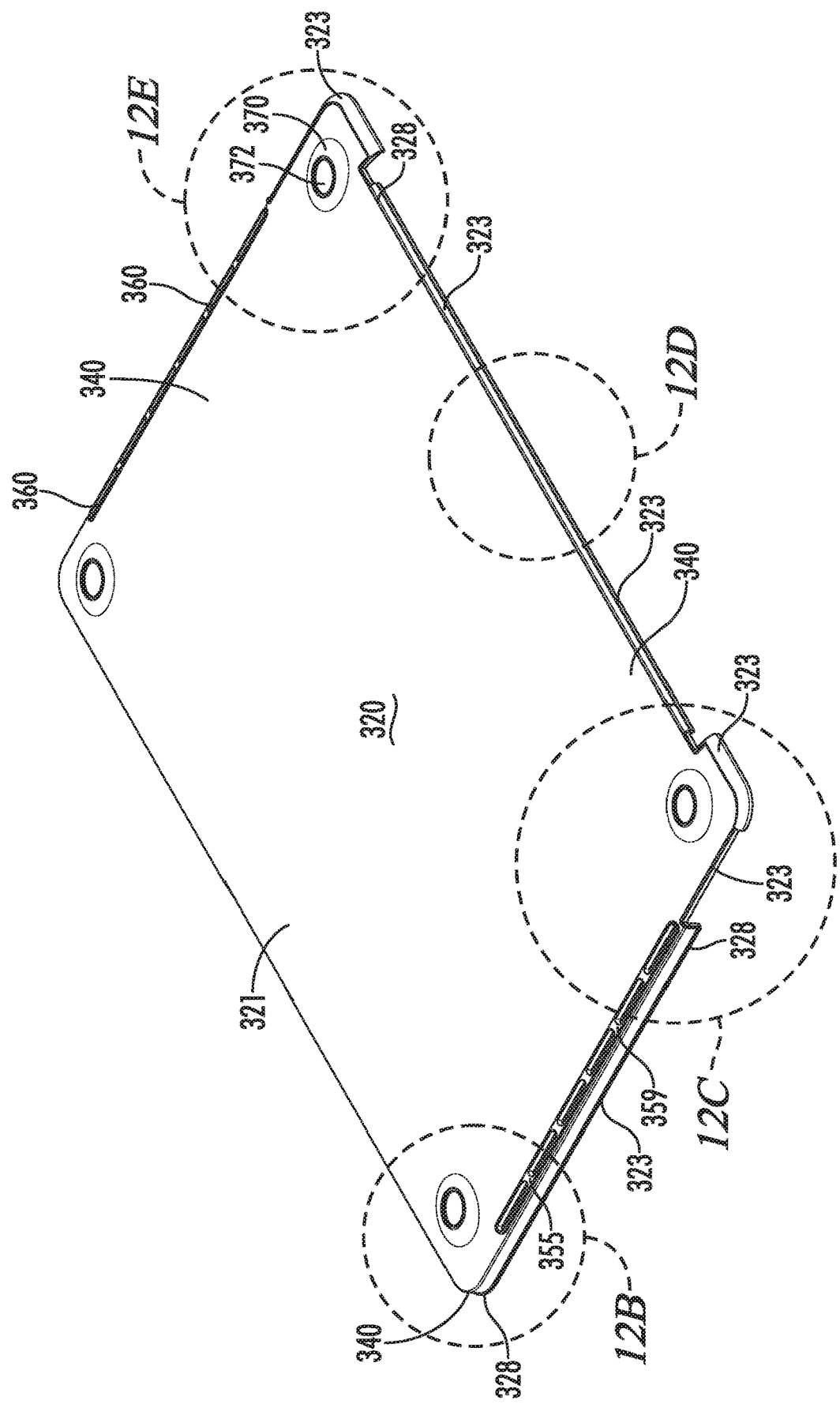
FIG. 12A is an exterior rear-right perspective view of the bottom cover panel illustrated in FIGS. 9A-9F.
Figure 12E:
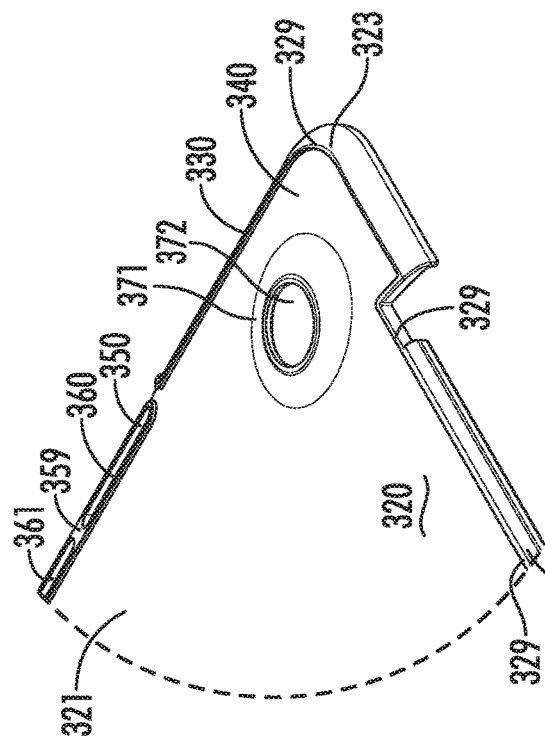
FIGS. 12B-12E are enlarged perspective views of the corresponding enumerated areas of the bottom cover panel circled in FIG. 12A to further illustrate the outer surface of the panel including the outwardly protruding footing platforms and the recessed regions defined the raised perimeter walls and the outwardly protruding ventilation aperture walls.
Figure 12D:
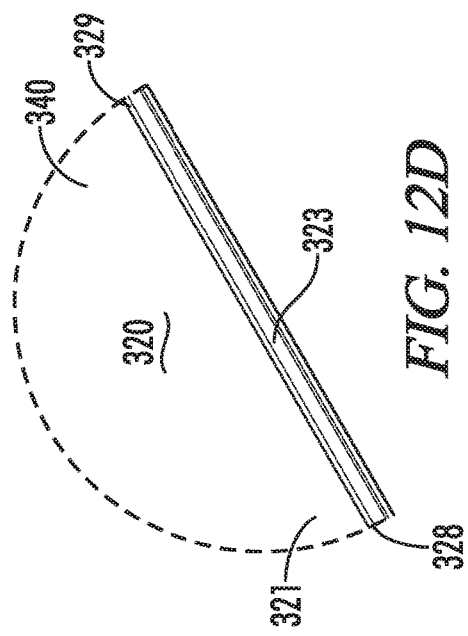
Figure 12B:
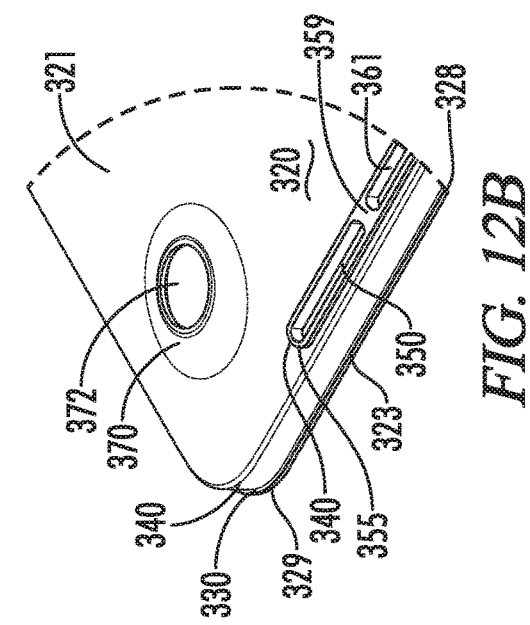
Figure 12C:
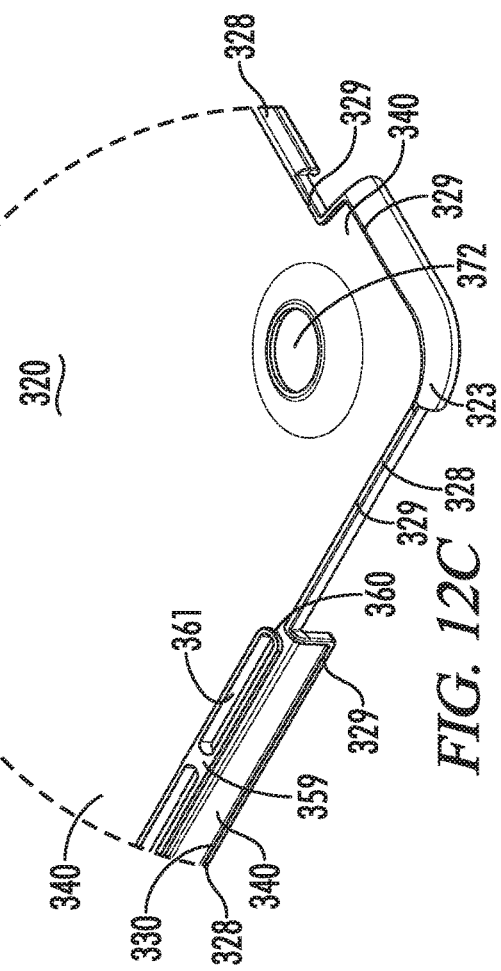

Each of the top and bottom panels 220, 320 include a raised perimeter wall or lip 228, 328, respectively, that extends longitudinally along the entirety of their respective perimeter edge region 223, 323 and projects outwardly from their respective outer surfaces 221, 321 to define corresponding raised surfaces 229, 329. Each of the raised perimeter lips 228, 328 are defined by a proximate side 230, 330 and opposing outer sides 231, 331, respectively. The proximate side 230 that defines the lip 228 on the top panel 220 defines a border that encircles a recessed region 240 formed on the outer surface 221 of the top panel 220. As measured on the proximate side 230 from the recessed region 240 extending outwardly from the base thereof to the raised surface 229, the lip 228 has a height defined by a first dimension, which, as representatively illustrated in FIG. 6B, is referred to as DT8. Similarly, the proximate side 330 that defines the lip 328 on the bottom panel 320 defines a border that encircles a recessed region 340 formed on the outer surface 321 of the bottom panel 320. As measured on the proximate side 330 from the recessed region 340 extending outwardly from the base thereof to the raised surface 329, the lip 328 has a height defined by a second dimension, which, as representatively illustrated in FIG. 11B, is referred to as DB8.

Each recessed region 240, 340 is covered with a corresponding fabric or leather overlay 290, 390. The top cover fabric or leather overlay 290 is sized to match recessed region 240 so as to terminate at the proximate side 230 of the raised lip 228 when adhesively coupled thereto. The overlay 290 has a thickness defined by a third dimension that is equal to or less than the first dimension, such that the outer surface of the overlay 290 resides at or below the raised surface 229 of the lip 228 at its perimeter extents bordering the proximate side 230 and is thus thereby protected by the border lip 228 from delaminating, fraying or peeling away from the outer surface 221 of the supporting top panel 220 to which it is coupled. Similarly, the bottom cover fabric or leather overlay 390 is sized to match recessed region 340 so as to terminate at the proximate side 330 of the raised lip 328 when adhesively coupled thereto. The overlay 390 has a thickness defined by a fourth dimension that is equal to or less than the second dimension, such that the outer surface of the overlay 390 resides at or below the raised surface 329 of the lip 328 at its perimeter extents bordering the proximate side 330 and is thus thereby protected by the border lip 328 from delaminating, fraying or peeling away from the outer surface 321 of the supporting bottom panel 320 to which it is adhesively coupled.

It should be understood that while the perimeter lips 228, 328 are illustrated to extend along the entire perimeter of their corresponding panels 220, 320, which provides an integrated border that is configured to mitigate against delaminating, fraying or peeling of the overlay 290, 390 on the entire periphery thereof, it is contemplated that the perimeter lips 228, 328 may be configured to extend along only multiple portions or only along a majority of the perimeter edge regions of the corresponding panels 220, 320. Hence, for example, it is contemplated that perimeter lips 228, 328 may extend along high impact zones, such as the corners and not extend along other less likely impact regions, such as along the right and left sides. It should be further understood that the perimeter edge regions 223, 323 and corresponding perimeter lips 228, 328 may be also configured to provide greater protection in high impact regions of the cover, such as at the corners thereof. Thus, for example in the illustrated embodiment, as best illustrated in FIGS. 1D-1F, 2A-2D, 3A-3B, 9A, 9D-9F, 10A, 10C, 10E, the rear corners of the bottom panel 320 includes a perimeter edge region 323 that wraps around from the sides to the face of the bottom panel 320, such that the perimeter lip 328 and the recessed region 340 adjacent thereto is positioned internally on the face of the panel 320 thereby protecting the overlay from direct rear side impacts and wear and tear. Such a wrap-around configuration of the perimeter edge region may be employed throughout either the top or bottom panels 220, 320 or in high impact regions such as the corners, side regions, around user interface apertures or even on support surfaces such as the regions around the support feet 380 and may extend sufficiently inward to form one or more or all of the support feet and thereby entirely replace one or more of the support feet 380.

The outer surface of the recessed regions 240, 340 may be textured to facilitate better adhesion to the overlaid material 290, 390. For example, the recessed regions 240 and/or 340 may have an MT-11010 texture, whereas the other areas of the panels 220, 320, including the display and keyboard compartments 225, 325 and the retention tabs 227, 327 may have a smooth finish (or un-textured surface), which would mitigate scratching the laptop computer 10 or other mobile electronic device. Different textures in the recessed regions 240, 340 may be used depending on the overlaid material and adhesive used.

The overlays 290, 390 may be made of any suitable organic or synthetic material including, but not limited to, woven or non-woven fabrics or textiles, leather, or combination thereof. The top and bottom overlays 290, 390 may be made of the same or different materials and may have the same or different thicknesses, equal to or less than the lip height dimensions DT8 (FIG. 6A, top panel 220) and DB8 (FIG. 11B, bottom panel). For example, it is contemplated that the top and bottom overlays 290 and 390 are formed of a single or multi-ply woven fabric that includes parallel grain lines that are oriented perpendicular to one another, and when coupled to the recessed regions 240, 340, the grain lines are oriented to run parallel and perpendicular to the length and/or width of the cover. As another example, it is contemplated that the top and bottom overlays 290, 390 are formed of a fabrics having different thicknesses or designs. Thus, for example the bottom overlay 390 may be formed of a more durable thicker fabric or leather than the top overlay 290, which may be formed of a more delicate fabric or leather or a fabric with a different design, pattern or color than the bottom. The bottom overlay 390 may for example be of a dark durable fabric or leather while the top overlay 290 may, for example, be of a lighter or less durable fabric or leather. While it is contemplated that the overlays 290, 390 are each formed as unitary piece of fabric or leather, it should be understood that the overlays 290 and/or 390 may be formed of multiple pieces of fabrics and/or leather and adhered to the recessed regions on the panel as separate pieces or as a single component. It should also be understood that the fabric and/or leather overlays 290 and/or 390 may be formed of multiple plies of fabric and/or leather with or without a fabric or leather backing.

The bottom cover 300, in the illustrated embodiment, further includes a plurality of ventilation apertures 350 that extend through the bottom panel 320 and are positioned at the right and left side regions to correspond to ventilation holes in the laptop computer 10. The ventilation apertures 350 are defined by outwardly protruding ventilation aperture walls 355 that extend from the recessed region 340 of the outer surface 321 of the panel 320. The walls 355 include proximate and internal sides 360, 361 that terminate at a raised surface 359. The proximate sides 360 of the walls 355 face outward from the ventilation apertures 350 toward the recessed region 340 whereas the internal side 361 define the ventilation apertures 350. As measured on the proximate side 360 from the recessed region 340 extending outwardly from the base thereof to the raised surface 359, the aperture walls 355 have a height, which, as representatively illustrated in FIG. 11B, is referred to as DB9. The height of the aperture walls 355 on the left and right sides of the bottom cover panel 320 may have the same or different dimensions. As illustrated in the drawings, the overlay 390 has a thickness that is equal to or less than the height (DB9) of the aperture walls 355, such that the outer surface of the overlay 390, when coupled to the panel 320, resides at or below the raised surface 359 of the walls 355 at the overlay's perimeter extents bordering the proximate side 360 of the aperture walls 355. In this way, the overlay is protected by the raised surface 359 of the aperture walls 355 from delaminating, fraying, or peeling away from the outer surface 321 of the supporting bottom panel 320 to which it is adhesively coupled.

The bottom cover panel 320, as illustrated in the preferred embodiment, includes outwardly protruding footing platforms 370 at each corner. The platforms 370 are integrally molded as part of the unitary molded panel 320 and are defined on the inner surface 322 of the panel 320 by opposing recessed regions 371. The overlay 390, extends over the external or outer surface 321 of the panel 320, as illustrated in FIGS. 1B-1F, 2C-2D, 3B and the cross sections depicted in FIGS. 13B-13C and 16. A support foot 380 (best illustrated in FIG. 15) is coupled atop the overlay 390 to each of said footing platforms 370. Each support foot 380 is secured via an attachment hole 372 extending through the footing platform 370 to the corresponding recessed region 371 on the inner surface 322 of the bottom panel 320 opposite the protruding footing platform 370.

Figure 15:
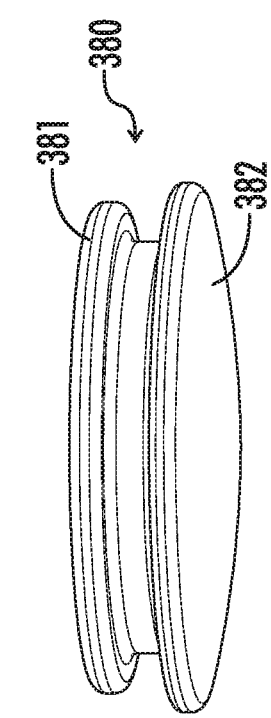
FIG. 15 is a perspective view of a support foot separated from the cover illustrating the internal and external portions thereof.

As illustrated in FIG. 15, the support foot 380 is dimensioned to include an internal portion 381 configured to reside on the interior surface 322 of recessed regions 371 and external portion 382 configured to reside over the outwardly protruding footing platforms 370 atop the overlay 390. The external and internal portions 382, 381 are connected by a mid-region having a lesser annular diameter, wherein the external portion 382 has a greater diameter than both the internal portion 382 and the mid-region and wherein the internal portion 381 has a greater diameter than the mid-region of the support foot 380. The support foot 380 may be formed of any suitable material. For example, the support foot 380 may be formed as a unitary component made of molded thermoplastic polyurethane (TPU) that is sufficiently flexible and resilient to be manually deformed such that the internal portion 381 can be inserted through the support foot attachment hole 372 from the exterior of the cover 300 and once inserted there-through released thereby allowing the internal portion 381 to resume its natural, unstressed shape.

The panels 220, 320 are dimensioned and otherwise configured to correspond to the shape of the laptop computer for which the cover is adapted to be used. Since each electronic device model typically has unique dimensions and user interfaces, it is contemplated that the cover is uniquely dimensioned for the specific electronic device model. Thus, by way of example, the table below provides potentially suitable internal compartment dimensions and lip 228, 328 dimensions (corresponding to the dimension lines set forth in FIGS. 4B, 6B, 9B, 11B) of the top and bottom panels 220, 320 for particular Apple MacBook laptop computers:

|     | MacBook 12 | MacBook Air 13 | MacBook Pro 13 | MacBook Pro 15 |
| --- | --- | --- | --- | --- |
| DT1 | 284.4 mm | 328.3 mm | 307.8 mm | 353.1 mm |
| DT2 | 200.4 mm | 230.6 mm | 216.1 mm | 244.2 mm |
| DT7 | 1.0 mm | 1.0 mm | 1.0 mm | 1.0 mm |
| DT8 | 0.7 mm | 0.7 mm | 0.7 mm | 0.7 mm |
| DB1 | 284.4 mm | 328.3 mm | 307.8 mm | 353.1 mm |
| DB2 | 200.4 mm | 230.6 mm | 216.1 mm | 244.2 mm |
| DB3 | 242.0 mm | 271.4 mm | 258.9 mm | 304.5 mm |
| DB4 | 159.5 mm | 173.8 mm | 167.4 mm | 194.9 mm |
| DB5 | 221.0 mm | 255.8 mm | 239.8 mm | 281.7 mm |
| DB6 | 195.8 mm | 223.1 mm | 208.1 mm | 236.6 mm |
| DB7 | 1.0 mm | 1.0 mm | 1.0 mm | 1.0 mm |
| DB8 | 0.7 mm | 0.7 mm | 0.7 mm | 0.7 mm |
| DB9 | 0.7 mm | 0.7 mm | 0.7 mm | 0.7 mm |

The dimensions set forth in the foregoing table are in millimeters ("mm"). Although not specified in the table, the thickness of the bottom and top panels 220, 320 may vary from 1.7 mm in the thicker perimeter edge regions 223, 323 to 1 mm in the relatively more thin areas on the face of the panels and their corresponding recessed regions 240, 340. The thickness of the fabric/cover overlays 290, 390 would be equal to or less than 0.7 mm, which is the height of the perimeter lips 228, 328 (DT8, DB8) and the height of the ventilation aperture wall surface 359 (DB9).

It should be understood that while described herein are some examples of implementations with specific dimensions, measurements, and values, these dimensions are not intended to be exhaustive or to limit the invention to the precise form described. Moreover, the dimensional values provided are approximate values and may vary due to, for example, measurement or manufacturing variations or tolerances or other factors. For example, depending on the design and the manufacturing tolerances, the values can vary plus or minus 2 percent, plus or minus 5 percent, plus or minus 7 percent, or plus or minus 10 percent. Further, the dimensions are for a specific implementation of the device, and other implementations can have different values, such as certain dimensions made larger for a larger-sized electronic devices, or smaller for a smaller-sized electronic devices. Internal cushions, insert, or components may also be inserted into the compartment 225, 325 of one or more of the panels 220, 320 that may also result in one or more of the internal dimensions of the panel cover panels 220, 320 being larger than the corresponding external dimension of the electronic device for which the panel is adapted for use.

It should also be understood that, as illustrated in the drawing, the top and bottom panels 220, 320 may each include user access apertures that correspond to user interfaces 33 on the laptop computer 10 and facilitate easy access thereto by the user. The location and size of those apertures would correspond to the location and size of the user interfaces 33.

The top and bottom panels 220, 320 may be formed of any suitable material. In a preferred implementation, the panels are formed of material selected from a group of polycarbonate, fiber reinforced plastic, polypropylene, high density polyethylene, acrylic, thermoplastic polymer, thermoset polymer. The panels are formed of different materials. The support foot may also be formed of any suitable material, including those previously set forth in connection with formation of the top and/or bottom panels 220, 320. In a preferred implementation the support foot 380 is formed of a material that has greater elasticity and flexibility than the material that forms the bottom panel 320.

As set forth in more detail below and illustrated by the manufacturing process flow diagrams of FIGS. 14A-14B, the top and bottom panels 220, 320 and the support feet 380 may each be manufactured as unitary structures by injection molding, the fabric/leather overlays are sized and then adhesively coupled to the recessed regions 240, 340 on the exterior or outer surface 221, 321 of the top and bottom panels 220, 320 respectively and the feet 380 attached to the bottom panel 320 through attachment holes 372.

Figure 14A:
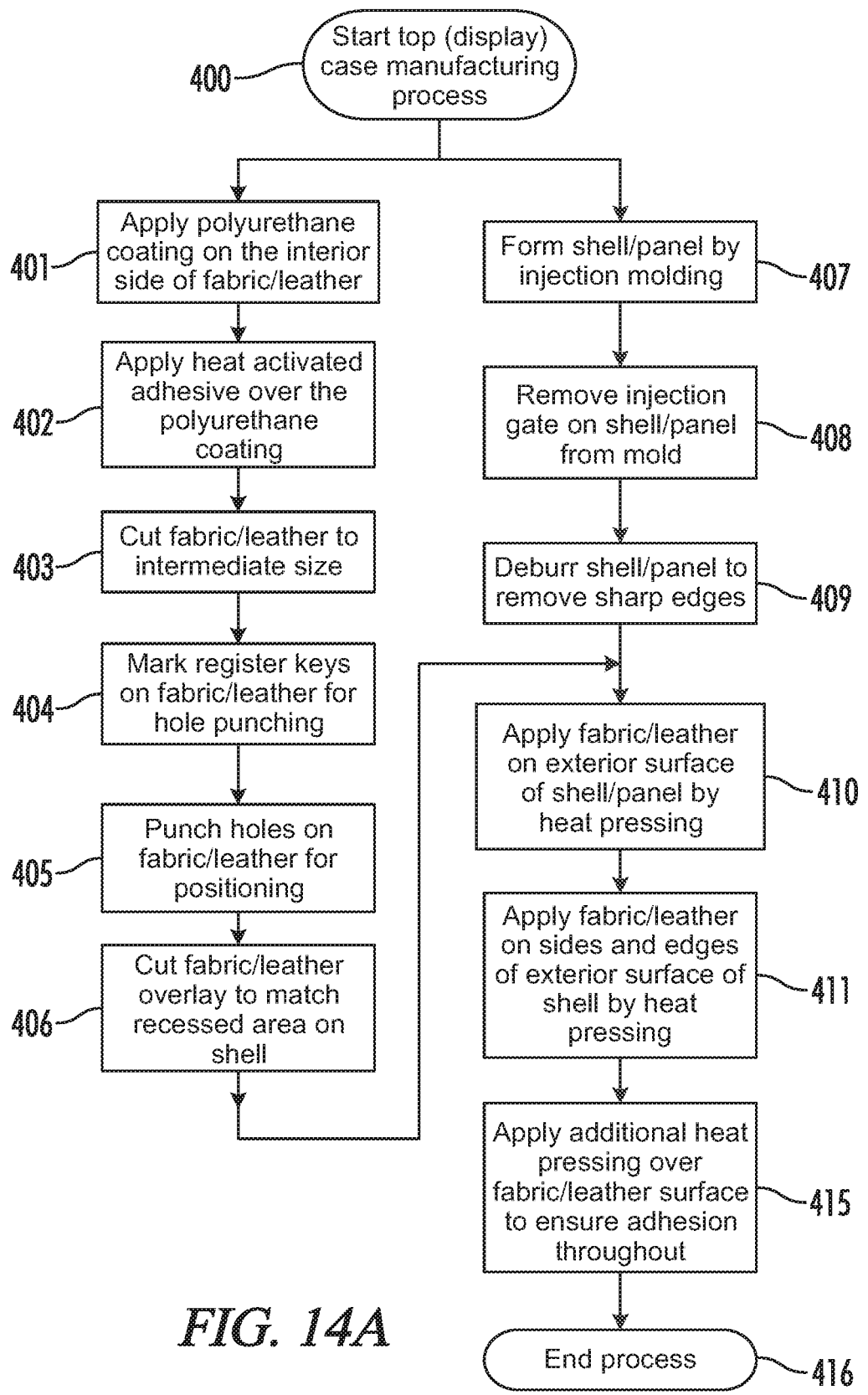
FIG. 14A is a flow diagram of an exemplary manufacturing process for making the top cover configured to cover the display portion of a laptop computer.
Figure 14B:
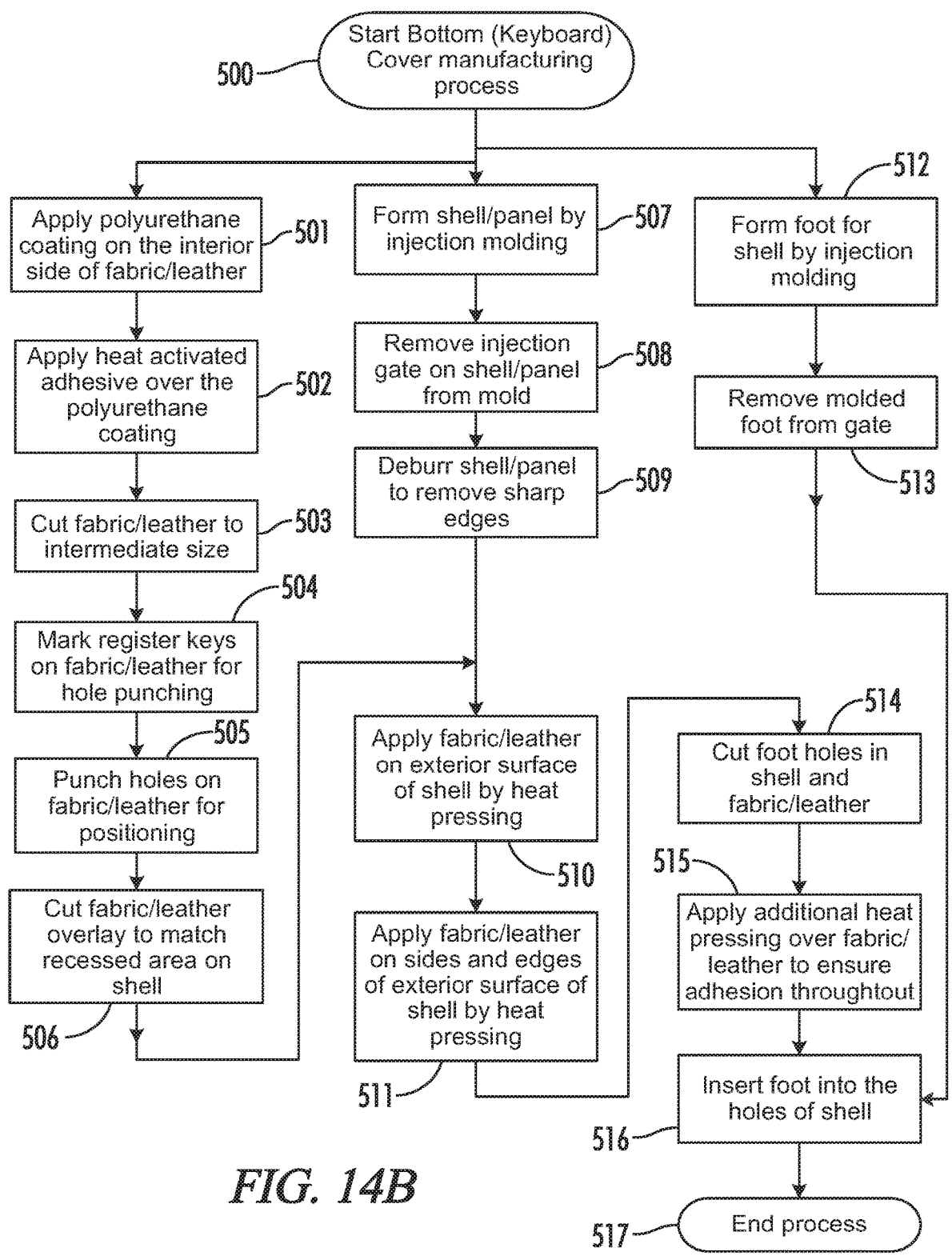
FIG. 14B is a flow diagram of an exemplary manufacturing process for making the bottom cover configured to cover the keyboard portion of a laptop computer.

More specifically, the flow diagrams of FIGS. 14A and 14B are directed to diagramming methods of manufacturing the protective cover 100, which is formed and dimensioned to reversibly and retentively receive and protect the laptop computer 10 having a display portion 20 and a keyboard portion 30. FIG. 14A is a flow diagram comprising of steps 400-416 for a process to manufacture the top cover 200. FIG. 14B is a flow diagram comprising of steps 500-517 for a process to manufacture the bottom cover 300. Similar steps in each process are described herein together.

Formation and Preparation of Top and Bottom Panels

Steps 407 and 507 are directed to forming top and bottom panels 220, 320 via injection molding. Steps 408 and 508 are directed to removing the respective top and bottom panels from their respective molds. Steps 409 and 509 are directed to deburring the respective top and bottom panels to remove any sharp edges or mold seepage.

The top and bottom panels 220, 320 may be molded to include the various configurational aspects described above. Thus, by way of example, the top panel 220 is molded to include the opposing inner and outer surfaces 221, 222 extending to the perimeter edge region 223 and is formed of a resilient flexible polymer material that is dimensioned to include the display portion compartment 225 defined by the inner surface 222 and reversibly and retentively snap-fit externally over the display portion 20. Similarly, the bottom panel 320 is molded to include the opposing inner and outer surfaces 321, 322 extending to the perimeter edge region 323 and is formed of a resilient flexible polymer material that is dimensioned to include the keyboard portion compartment 325 defined by the inner surface 322 and reversibly and retentively snap-fit externally over the keyboard portion 30. Each of the top and bottom panels 220, 320 is molded to include: (i) a plurality of retention tabs 227, 327 extending inwardly from its inner surface 222, 322 and positioned and dimensioned to retain the panel on the corresponding portion of the laptop 10, and (ii) an outwardly protruding wall structure extending longitudinally along the perimeter edge region 223, 323 and projecting outwardly from the outer surface to define the raised perimeter lip 228, 328 and adjacent recessed regions 240, 340 on the respective panel's outer surface. The bottom panel 320 is molded to include (i) the ventilation apertures 350 defined by the aperture walls 355 and raised wall surface 359 and the outwardly protruding foot platforms 370 and corresponding opposing recessed regions 370.

Formation of Support Feet

Steps 512 and 513 are directed to forming the support feet 380, for the bottom cover 300, via injection molding and removing the feet from the mold after molding in preparation for attaching the feet 380 to the bottom cover panel 320. Each foot 380 is molded to include an internal portion 381 and an external portion 382 that is connected by a mid-portion of less diameter as previously described. The foot is preferably molded of an elastic resilient material such as thermoplastic urethane. Other feet may also be employed, for example a two piece foot 380 where the external portion 382 and the internal portion 381 are formed separated from one another and then mechanically or adhesively coupled to the panel 320 directly or each other when attached to the panel 320.

Preparing Fabric/Leather Overlays and Adhesively Coupling them to the Recessed Regions of the Panels Steps 401-406 and 501-506 generally detail the preparation of the fabric/leather overlay and Steps 410-411, 414 and 510-511, 515 detail the steps involved in adhesively coupling the fabric/leather to the corresponding panel 220, 320.

Step 401 and 501 are directed to preparing fabric or leather overlay 290, 390 by applying a polyurethane coating to the inner surface of the overlay and allowing the coating to dry. The polyurethane coating may be of any suitable thickness. In one implementation the polyurethane coating is approximately 0.05 mm thick. The polyurethane coating bonds well to the overlay and facilitates improved adhesion by the adhesive to the polymer panels 220, 320 as described below. In addition, the polyurethane coating may provide utility besides facilitating adhesion of the glue, such as to provide the fabric overlay with stiffness and may assist in preventing the edges of the fabric from fraying. In some implementation, the polyurethane coating may, depending on the nature and thickness of the coating, provide the fabric with a resilient and full appearance and serve as a cushion layer between the outer surface of the fabric and the more rigid panel.

Steps 402 and 502 are directed to apply a heat activated adhesive or glue coating over the polyurethane coating. In one implementation, the heat activated adhesive or glue has a thickness in the range of approximately 0.05 mm to 0.10 mm. With respect to steps 401-402 and 501-502, the entire roll of fabric or leather material may be processed through an application machine that applies the polyurethane on the inner surface and then a heat activated adhesive or glue on top of the polyurethane coating.

Once the polyurethane and heat activated adhesive layers are applied over the inner side of the fabric or leather, as set forth in steps 403 and 503, the fabric or leather overlay is cut into an intermediate size (e.g., a smaller rectangular size) to facilitate manipulation and handling. Notably, steps 403 and 503 produce fabric or leather overlay constructs that are layered with polyurethane and heat activated adhesive and are oversized relative to the recessed areas 240, 340 of the corresponding panels 220, 320. Cutting after the polyurethane and heat activated glue is applied can help ensure that those layers extend all the way to the edges of the cut fabric or leather overlay.

Once the fabric or leather overlay construct is initial cut (per steps 403, 503), the overlay constructs are marked for register keys, which are holes in the fabric that are used to prevent movement of the overlay constructs and ensure that the fabric is properly oriented. (Steps 404, 504).

Steps 405 and 505 are directed to punching the register key holes in the overlay constructs. The register key holes are used for alignment and to orient the overlay construct at each step and to retain the position during the laser cutting and for silk screening logos on the exterior of the fabric/leather overlay.

Steps 406, 506 are directed to cutting the fabric or leather overlay constructs so that they are sized to match the corresponding areas of the recessed regions 240, 340 of the panel 220, 320. The cutting may be performed by laser or any suitable mechanical means, for example, die cut. Laser cutting has been found to be highly accurate, and provide great consistency and control. In addition, it results in a clean seared edge of the overlay construct that can mate precisely and neatly against the proximate sides 230, 330, 360 of the perimeter and ventilation walls. The laser cutting can also be automated with high speed and cutting throughput.

As set forth in steps 410-411 and 510-511, once the overlay constructs are cut to match the size of their corresponding recessed regions 240, 340, the overlay constructs are respectively mated and adhered thereto so that their perimeter cut edges extend to the corresponding proximate side 230, 330, 360 of the perimeter and ventilation walls of their respective panels 220, 320. Thus, it is the heat activated adhesive layer or coating that comes into direct contact with and adheres to the recessed regions 240, 340 of the panels 220, 320. A heat plate may be used to heat activate the adhesive coating and exert pressure on the exterior surface of the overlay to ensure uniform adhesion to the recessed regions 240, 340 of the panels 220, 320. Initially the heat plate may be applied over the center region of the overlay and then along the sides regions, thereby initially securing the overlay to the center or face regions of the panel 220, 320 and then working outwards securing the overlay outward the center to the perimeter edge regions of panel.

Forming Foot Attachment Holes and Attaching Feet to Bottom Panel

Once the support feet 380 are formed in accordance with steps 512-513, and the fabric/leather overlay 390 is applied over the recessed region 340 of the outer surface 321 of the bottom panel 320, step 514 is directed to the foot attachment holes 372 being cut through the overlay 390 and the footing platforms 370 of the bottom panel 320. A laser, or any suitable cutting means, may be used to cut the foot attachment holes 372. The foot attachment holes 372 are cut after the fabric/leather overlay 390 is applied and adhered over and to the outer surface 321 of the outwardly protruding footing platforms 370. Once the foot attachment holes 372 are cut, as per step 515, additional heat pressing over the fabric/leather overlay 390 may be applied (to the extent needed), including around the foot attachment holes 372 and other regions of the panel 390, to ensure full and complete adhesion of the overlay 390 to the outer surface 321 and recessed regions 340 of the panel 320. Because the foot attachment holes 372 are cut through both the panel 320 and the fabric overlay 390 at the same time, the cutting process is capable of ensuring that the foot attachment hole 372 in the bottom panel 320 are aligned and perfectly matched with the foot attachment hole 372 in the overlay 390. Once the foot attachment holes 372 are cut, a support foot 380 is secured thereto per step 516. Each support foot 372, as previously described, is formed of a flexible elastic material capable of being stressed or distorted and yet have sufficient resiliency and elasticity to allow it to resume its original shape after the stress is removed. The support foot 380 is secured by sufficiently distorting the shape of the internal portion 381 and inserting it through the foot attachment hole 372 from the outside of the panel 320. This can be done manually or be automated. Once inserted through the hole 372, the distortion pressure is removed and the internal portion 381 resumes its original shape and expands into position wherein its retained and supported by the recessed region 371 on the internal surface 322 opposite the foot platform 370. Once the support foot 380 is secured, the peripheral regions of the external portion 382 resides externally over both the protruding footing platform 370 and the overlying fabric/leather overlay 390, to which it is in contact, thereby further protecting the fabric/leather overlay 390 from peeling, fraying or delaminating. When other types of feet are employed, e.g., a two piece foot 380 where the external portion 382 and the internal portion 381 are formed separated from one another, the attachment process may be mechanical and/or via adhesive coupling directly to the panel 320 to opposing components 381, 382 of the support foot 380 when the foot is attached to the panel 320.

Further it should be understood that while the bottom cover 300 includes footing platforms 370 and feet 380, the top cover 200 may be manufactured in the same manner to include footing platforms 370 and feet 380. Similarly, it should be understood that while the top cover does not include footing platforms 370 and feet 380, the bottom cover 300 may be manufactured in the same manner to exclude footing platforms 370 and feet 380. Also, while the ventilation holes 350 and corresponding wall structures are included in the bottom cover 300, it should be understood that the ventilation holes 350 may be manufactured in the top cover 200 to correspond with ventilation needs or structures in the display portion 20 of the electronic device 10. Thus, while particular manufacturing aspects are described as being part of the top or bottom cover 200, 300, it should be understood that those manufacturing process including the configuration of components thereof may be used to either the top or bottom cover in combination or alone.

This description of the invention has been presented for the purposes of illustration and description. It is not intended to be exhaustive or to limit the invention to the precise form described, and many modifications and variations are possible in light of the teaching above. The embodiments were chosen and described in order to facilitate explanation of the principles of the invention and its practical applications. This description will enable others skilled in the art to best utilize and practice the invention in various embodiments and with various modifications as are suited to a particular use. The scope of the invention is defined by the following claims.

What is claimed is:

1. An exterior cover formed and dimensioned to reversibly and retentively receive and protect a laptop computer having a display portion and a keyboard portion, said cover comprising:
    a first panel configured to cover the display portion and a second panel configured to cover the keyboard portion, wherein each of said panels is independent and separate from one another and each panel is formed as a unitary component of a molded resilient polymer material and is dimensioned to reversibly and retentively snap-fit over the display and keyboard portions, respectively;
    wherein the first panel is defined by a first inner surface from an opposing first outer surface separated by a first perimeter edge region, the first inner surface defining a first compartment dimensioned to receive and overlay the outside surface of the display portion of the laptop computer; said first panel further comprising:
        (i) a first plurality of tabs located at the first perimeter edge region and extending inwardly from the first inner surface in a transverse direction therefrom, wherein said first plurality of tabs is dimensioned to engage an inner surface of the display portion of the laptop computer; and
        (ii) a first protruding wall extending longitudinally along the entire first perimeter edge region and projecting outwardly from the first outer surface to a first raised surface a height having a first dimension to define a first perimeter lip, said first protruding wall having a proximate side and an opposing outer side and further defining a first recessed region on the first outer surface, said first recessed region extending from said proximate side of said first protruding wall;
    wherein the second panel is defined by a second inner surface and an opposing second outer surface separated by a second perimeter edge region, the second inner surface defining a second compartment dimensioned to receive and overlay the outside surface of the keyboard portion of the laptop computer; said second panel further comprising:
        (i) a second plurality of tabs located at the second perimeter edge region and extending inwardly from the second inner surface in a transverse direction therefrom, wherein said second plurality of tabs is dimensioned to engage an inner surface of the keyboard portion of the laptop computer; and
        (ii) a second protruding wall extending longitudinally along the second perimeter edge region and projecting outwardly from the second outer surface to a second raised surface a height having a second dimension to define a second perimeter lip, said second protruding wall having a proximate side and an opposing outer side and further defining a second recessed region on the second outer surface, said second recessed region extending from the proximate side of said second protruding wall;
    a first fabric overlay sized to match the first recessed region and adhesively coupled with heat and pressure to the first recessed region,
        wherein the first fabric overlay terminates at the proximate side of the first protruding wall, said fabric overlay having a thickness that is defined by a third dimension that is equal to or less than the first dimension; and
    a second fabric overlay sized to match the second recessed region and adhesively coupled with heat and pressure to the second recessed region,
        wherein the first fabric overlay terminates at the proximate side of the second perimeter lip, said second fabric overlay having a thickness that is defined by a fourth dimension that is equal to or less than the second dimension.

2. The cover of claim 1, wherein the first panel is formed of a first polymer material and the second panel is formed of a second polymer material that is different than the first polymer material.

3. The cover of claim 1, wherein the first and second panels are formed of polycarbonate.

4. The cover of claim 1, wherein the first and second fabric overlays are formed of different fabrics.

5. The cover of claim 1, wherein the first and second fabric overlays are formed of the same woven fabric.

6. The cover of claim 1, wherein the second panel further comprises one or more ventilation apertures on a first side region, wherein said ventilation apertures are defined by a third protruding wall projecting outwardly from the second outer surface a height having a fifth dimension to a third raised surface, wherein said third raised wall has a proximate side and an opposing internal side, wherein said second recessed region further extends from said proximate side of said third protruding wall, and wherein said fourth dimension is equal to or less than the fifth dimension.

7. The cover of claim 6, wherein the second panel further comprises one or more ventilation apertures on a second side region, wherein said ventilation apertures are defined by a fourth protruding wall projecting outwardly from the second outer surface a height having a sixth dimension to a fourth raised surface, wherein said fourth raised wall has a proximate side and an opposing internal side, wherein said second recessed region further extends from said proximate side of said fourth protruding wall, and wherein said fourth dimension is equal to or less than the sixth dimension.

8. The cover of claim 1, wherein the second panel further comprises one or more outwardly protruding footing platforms.

9. The cover of claim 8, wherein said second fabric overlays said one or more outwardly protruding footing platforms.

10. The cover of claim 9 further comprising a support foot coupled over said second fabric overlay to each of said footing platforms, wherein said support foot is secured via an aperture extending through the footing platform to a corresponding recessed region on the inner surface of the second panel opposite the protruding footing platform.

11. The cover of claim 10, wherein said support foot is formed of a material selected from the group consisting of polymer and metal.

12. The cover of claim 1, wherein each panel includes side walls that are configured to cover the side surfaces of the corresponding display and keyboard portions when fitted thereon and wherein one or more of said side walls includes apertures dimensioned to expose one or more ports, jacks, microphones, and speakers located on at least one of the display or keyboard.

13. The cover of claim 1 wherein either of the first and second panel is formed of a material selected from the group consisting of polycarbonate, fiber reinforced plastic, polypropylene, high density polyethylene, acrylic, thermoplastic polymer, and thermoset polymer.

14. The cover of claim 13, wherein the first and second panels are formed of different materials.

15. The cover of claim 1, wherein at least one of the first and second protruding walls extends longitudinally along the entire first or second perimeter edge regions.

16. The cover of claim 1, wherein at least one of the first and second protruding walls extends longitudinally along multiple portions of the first or second perimeter edge regions.

17. The cover of claim 1, wherein at least one of the first and second protruding walls extends longitudinally along a majority of the first or second perimeter edge regions.

18. The cover of claim 1, wherein the fabric is substituted with synthetic or natural leather.

19. The cover of claim 10, wherein said support foot is formed of a material that has greater elasticity and flexibility than the resilient polymer material that forms the second unitary panel.

* * * * *